US011187446B2

United States Patent
Brady et al.

(10) Patent No.: US 11,187,446 B2
(45) Date of Patent: Nov. 30, 2021

(54) ANOMALY DETECTION IN A REFRIGERATION CONDENSOR SYSTEM

(71) Applicant: INTERNATIONAL BUSINESS MACHINES CORPORATION, Armonk, NY (US)

(72) Inventors: Niall Brady, Kildare (IE); Paulito P. Palmes, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 952 days.

(21) Appl. No.: 15/491,204

(22) Filed: Apr. 19, 2017

(65) Prior Publication Data
US 2018/0306476 A1    Oct. 25, 2018

(51) Int. Cl.
F25B 49/00    (2006.01)
G05B 23/02    (2006.01)
F25B 49/02    (2006.01)

(52) U.S. Cl.
CPC ........ F25B 49/005 (2013.01); G05B 23/0235 (2013.01); *F25B 49/027* (2013.01); *F25B 2700/15* (2013.01); *F25B 2700/2106* (2013.01); *G05B 2219/2654* (2013.01)

(58) Field of Classification Search
CPC ..... F24F 11/00; G05B 13/02; G05B 23/0235; G05B 2219/2654; F25B 49/005; F25B 49/027; F25B 2700/15; F25B 2700/2106
USPC .......................................................... 706/23
See application file for complete search history.

(56) References Cited

U.S. PATENT DOCUMENTS

| | | | |
|---|---|---|---|
| 6,785,592 B1 * | 8/2004 | Smith .................... | G06Q 50/06 700/291 |
| 7,079,967 B2 | 7/2006 | Rossi et al. | |
| 8,694,205 B1 * | 4/2014 | Yerke ................. | B60H 1/00742 701/36 |
| 8,800,309 B2 | 8/2014 | Buda et al. | |
| 8,977,405 B2 * | 3/2015 | Shiel ...................... | G06Q 50/06 700/291 |
| 9,121,407 B2 | 9/2015 | Pham | |
| 9,366,451 B2 | 6/2016 | Guo et al. | |
| 9,551,504 B2 * | 1/2017 | Arensmeier .............. | F24D 5/04 |
| 10,344,997 B2 * | 7/2019 | Alsaleem ................ | F24F 3/044 |
| 2004/0210419 A1 * | 10/2004 | Wiebe .................. | F25B 49/005 702/182 |

(Continued)

FOREIGN PATENT DOCUMENTS

| | | |
|---|---|---|
| CN | 104154704 B | 6/2016 |
| WO | 2012164690 A1 | 12/2012 |
| WO | 201671947 A1 | 5/2016 |

OTHER PUBLICATIONS

'Design and simulation of self-tuning PID-type fuzzy adaptive control for an expert HVAC system': Soyguder, 2009, Expert Systems with Applications 36 (2009) 4566-4573.*

(Continued)

Primary Examiner — Li B. Zhen
Assistant Examiner — Peter D Coughlan
(74) Attorney, Agent, or Firm — Griffiths & Seaton PLLC

(57) ABSTRACT

Embodiments for fault diagnosis and analysis of refrigeration condenser systems by a processor. An energy usage anomaly is detected in a condenser by comparing an energy usage profile of the condenser against a knowledge domain of energy usage standards and energy usage standards anomalies.

20 Claims, 22 Drawing Sheets

(56) References Cited

U.S. PATENT DOCUMENTS

| | | | |
|---|---|---|---|
| 2008/0077260 A1 | 3/2008 | Porter et al. | |
| 2012/0166151 A1* | 6/2012 | Fisera | F25B 49/005 |
| | | | 703/2 |
| 2013/0340450 A1 | 12/2013 | Ashrafzadeh et al. | |
| 2014/0201118 A1* | 7/2014 | Cleve | G06N 3/04 |
| | | | 706/44 |
| 2016/0169572 A1 | 6/2016 | Noboa et al. | |
| 2016/0187899 A1* | 6/2016 | Lee | F24F 11/62 |
| | | | 236/44 C |
| 2016/0211664 A1* | 7/2016 | Subbotin | G05B 13/026 |
| 2017/0017735 A1* | 1/2017 | Srinivasan | G01R 22/061 |
| 2017/0052072 A1* | 2/2017 | Beaven | G05B 23/0235 |
| 2017/0300046 A1* | 10/2017 | Kerbel | G05B 15/02 |
| 2018/0051922 A1* | 2/2018 | Ochiai | F25B 43/006 |

OTHER PUBLICATIONS

'Studies on Neural Network Modeling for Air Conditioning System by Using Data Mining with Association Analysis': Wang, 2011, IEEE, 2011 International Conference on Internet Computing and Information Services.*

* cited by examiner

ANOMALY DETECTION IN A REFRIGERATION CONDENSOR SYSTEM

BACKGROUND OF THE INVENTION

Field of the Invention

The present invention relates in general to computing systems, and more particularly to, various embodiments for energy usage anomaly detection and fault diagnosis of refrigeration condenser systems by a processor.

Description of the Related Art

In today's society, various refrigeration advances, coupled with advances in technology have made possible a wide variety of attendant benefits, such as increasing the efficiency of refrigeration systems. As computers proliferate throughout aspects of society, additional opportunities continue to present themselves for leveraging technology in refrigeration systems for improving efficiency of power and energy consumption while minimizing energy footprints.

SUMMARY OF THE INVENTION

Various embodiments for energy usage anomaly detection and fault diagnosis of refrigeration condenser systems by a processor, are provided. In one embodiment, by way of example only, a method for fault diagnosis and analysis of refrigeration condenser systems using a singular Internet of Things (IoT) enabled meter point by a processor is provided. An energy usage anomaly may be detected in a condenser by comparing an energy usage profile of the condenser against a knowledge base of energy usage condenser behaviors created in a machine learning phase of the energy usage assessment of a complete refrigeration estate. The condenser may be in an IoT computing network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Refrigeration is a process of moving heat from one location to another in controlled conditions. The work of heat transport may be driven by mechanical work, but can also be driven by heat, magnetism, electricity, laser, or other means. Refrigeration has many applications, including, but not limited to: household refrigerators, industrial freezers, cryogenics, and air conditioning. Heat pumps may use the heat output of the refrigeration process, and may be designed to be reversible, but are otherwise similar to air conditioning units.

Figure 4A:
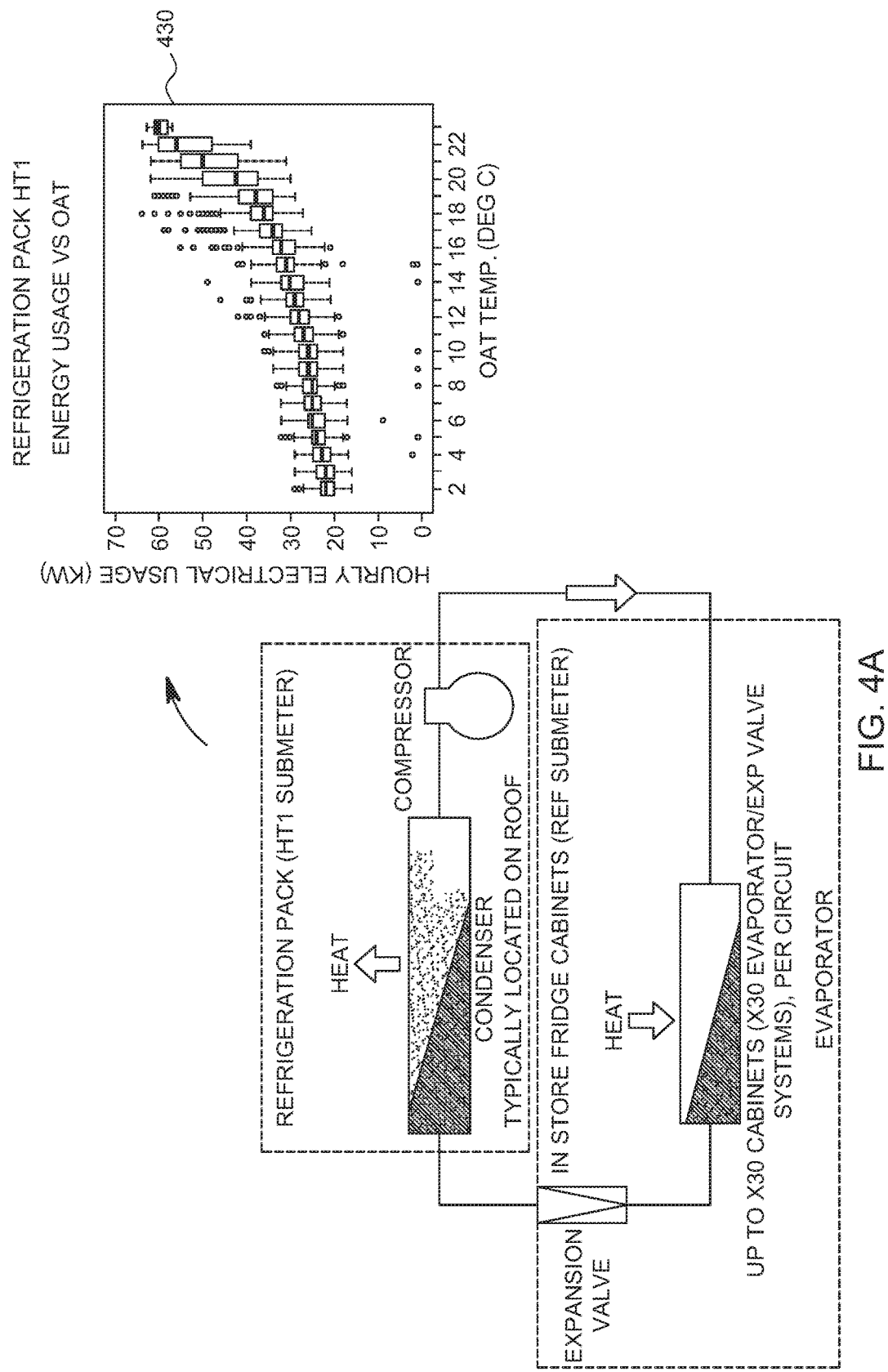
FIG. 4A-B are diagrams depicting various user hardware and computing components functioning in accordance with aspects of the present invention.

More specifically, as illustrated in FIG. 4A, a refrigeration cooling energy supply system may be referred to as a "Pack" or "refrigeration pack" and may include multiple compressors to compress refrigerant gas taken from one or more instore fridge cabinets. A condenser device or unit ("Condenser") may be used to condense a substance from its gaseous to its liquid state, by cooling it. In effect the function of the condenser in the refrigeration cycle is to extract the heat gained from the instore fridge cabinets and move the extracted heat to the outside air through the pumping of hot refrigerant gas over the condenser's efficient heat exchange capabilities, as illustrated in FIG. 4A. The packs may vary in size and composition dependent on the type and capacity of cooling energy provided and may be divided into systems such as, for example, low temperature "LT" systems for freezing (less than negative ("−") 20 degrees centigrade), and/or high temperature "HT" systems for chilling.

It should be noted in reference to submeter energy usage measurement and labelling used within refrigeration packs, the HT systems such as, for example HT1 of FIG. 4A, energy usage may refer to the energy usage for Refrigeration Pack HT1 (or Refrigeration Pack that may be needed—not shown for illustrative convenience). There may be additional system categories such as, for example, REF and TBD. In one aspect, REF may refer to an amount of energy used by a refrigeration cabinet(s) within the store and may not relate to any specific pack, and TBD may be unaccounted for energy meter type and/or non-discernible energy meter type.

Also, it should be noted that an important characteristic of refrigeration packs, either for HT or LT systems having large condensers, is a large energy footprint (e.g., greater than a defined energy usage threshold or a defined percentage such as, for example, where a large energy footprint may result from a single large pack that accounts for between 5%-10% of an overall stores electrical energy usage) and hence the focus for energy analytics application enables achievement of significant energy savings. Unfortunately, however, refrigeration packs are currently considered a "black box technology" where energy improvements are predominantly driven by hardware upgrades (e.g., upgrades to propriety or protected systems). Compounding the difficulty in improving the "black box technology" (e.g., refrigeration packs having condensers) is system control providers running proprietary closed control systems that do not provide open access to the underlying system parametric data for the data analytics community, which prohibits exploiting underlying datasets and leaving the underlying significant energy savings untapped, and unexploited.

For air cooled condensers, there is a known correlation between outside air temperatures (OAT) and condenser efficiency, in that the higher the OAT the harder it is for the condenser to extract heat from the hot refrigerant gas as the temperature difference between the hot gas and the OAT narrows. The condenser continues to increase its heat rejection capacity (increasing condenser loading) by increasing fan speeds, or staging in additional fans depending on the technology. At 100% fan capacity, the condenser is considered fully loaded and cannot offer any further heat rejection capacity. As the OAT continues to increase, the objective of the refrigeration pack is to protect the cooling temperature supplied to instore cabinets so more compressors are brought on line. This results in large increases in energy usage, and gives rise to the typical energy usage versus outside air temperature profile as seen in graph 430 of FIG. 4A.

Thus, various embodiments are provided for energy usage anomaly detection and fault diagnosis of refrigeration condenser systems by a processor, by exploiting one or more characteristics of energy to outside air temperature profile which is discovered to be unique for each individual condenser. In one embodiment, by way of example only, a method for fault diagnosis and analysis of refrigeration condenser systems using a singular Internet of Things (IoT) enabled meter point by a processor is provided. An energy usage anomaly may be cognitively detected in a condenser by comparing an energy usage profile of the condenser against a knowledge domain of energy usage standards and energy usage standards anomalies. The condenser may be in an IoT computing network.

In one aspect, the present invention provides for automatically detecting an energy usage anomaly in a condenser such as, for example, detecting an energy usage anomaly in a peer-to-peer refrigeration system. The present invention provides for a root cause analysis to be performed for each condenser for the detected energy usage anomalies and an estimation of an accurate energy cost wastage using one or more fault detection algorithms. The present invention may also provide for dissemination of refrigeration system pack type systems such as, for example HT or LT systems, in the presence of submetering labelling ambiguity, using one of the proposed fault detection algorithms, as described herein (see FIGS. 4A-4B). The present invention provides for detection of performance degradation of the condenser via application of one or more energy usage anomaly detection and fault diagnosis operations.

By exploiting the discovered behavior of condensers, the present invention provides for effective anomaly detection, fault diagnosis, and root cause analysis of outside air cooled refrigeration condenser systems without the need to access the underlying parametric data which is known to be problematic. The effective anomaly detection, fault diagnosis, and root cause analysis may be achieved through the ingestion of independently acquired underlying energy usage data, merged with outside air temperatures acquired from readily available local weather stations, and by parameterizing these discovered unique signals and developing underlying energy usage models that can then be used to perform automated anomaly detection at an individual condenser level.

In one aspect, the present invention provides for parameterization by the generation of one or more operations that dissect and calculate signal derivatives across local outside air temperature ranges for each individual condenser, that can then be automatically compared to established standards (e.g., defined standards for normal operation) for different condenser types, HT or LT for effective peer-to-peer comparison and anomaly detection. Also, the present invention applies a zonal temperature dissection operation, and conducts a condenser profile comparison assessment against a knowledge base of previously detected and analyzed anomalous signals where historical root cause analysis has been tested and validated. In this way, the present invention provides additional automated fault diagnosis capability thereby providing an underlying root cause for the detected energy usage anomaly in a condenser. The present invention may also provide failure prediction capabilities for a condenser.

In one aspect, the mechanisms of the illustrated embodiments employ artificial intelligence, such as machine learning, to allow computers to simulate human intelligence and choices based on significant amounts of empirical data. Machine learning may capture characteristics of interest and their underlying probability distribution, and a training dataset may be used to train a machine learning model. A model or rule set may be built and used to predict a result based on the values of a number of features. The machine learning may use a dataset that typically includes, for each record, a value for each of a set of features, and a result. From this dataset, a model, rule set, or standardized operation for predicting and cognitively detecting an energy usage anomaly in a condenser is developed.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing system that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, intelligent search algorithms, such as Internet web page searches, for example, energy usage analysis, energy anomaly detections, energy waste improvement diagnostic and treatment recommendations, and other types of recommendation generation, e.g., items of interest to a particular user, potential new contact recommendations, or the like.

In general, such cognitive systems are able to perform the following functions: 1) Navigate the complexities of human language and understanding; 2) Ingest and process vast amounts of structured and unstructured data; 3) Generate and evaluate hypothesis; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) High degree of relevant recollection from data points (images, text, voice) (memorization and recall); and/or 13) Predict and sense with situational awareness that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
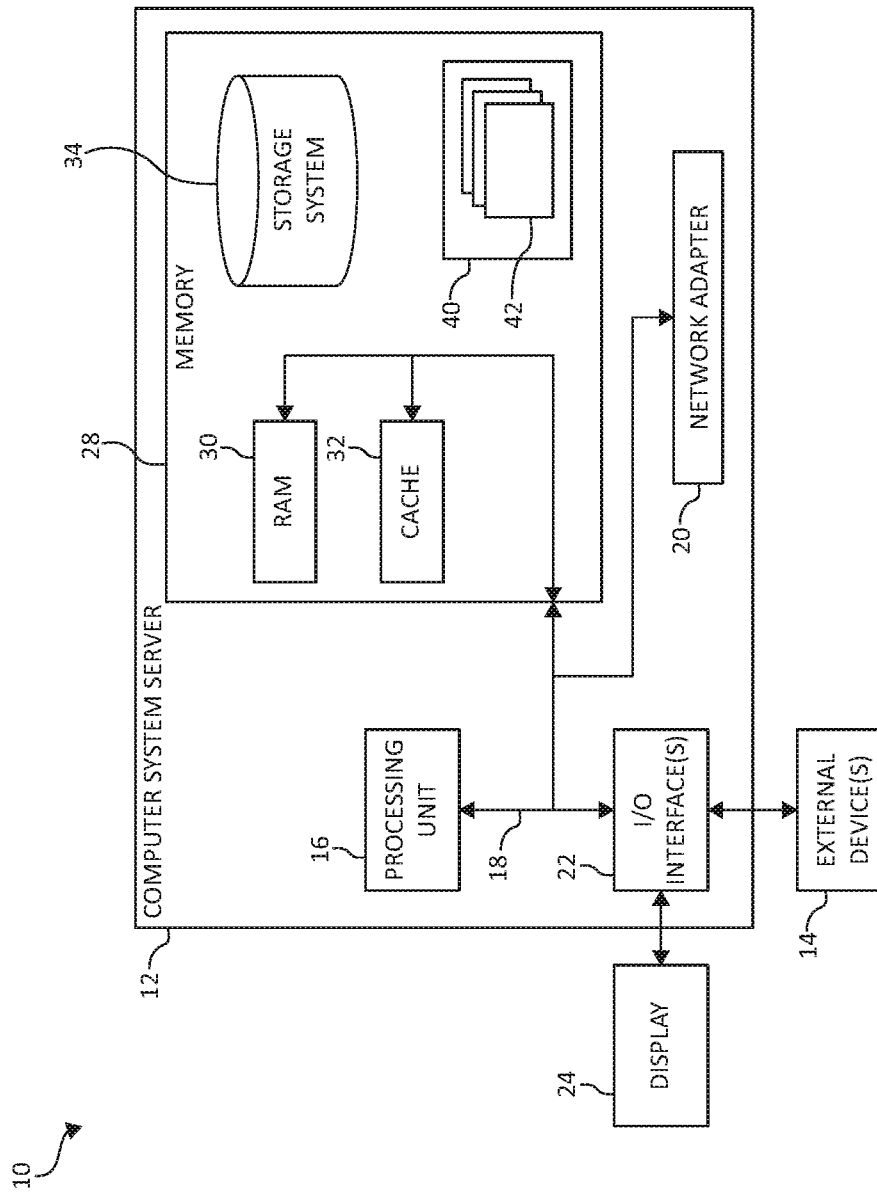
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
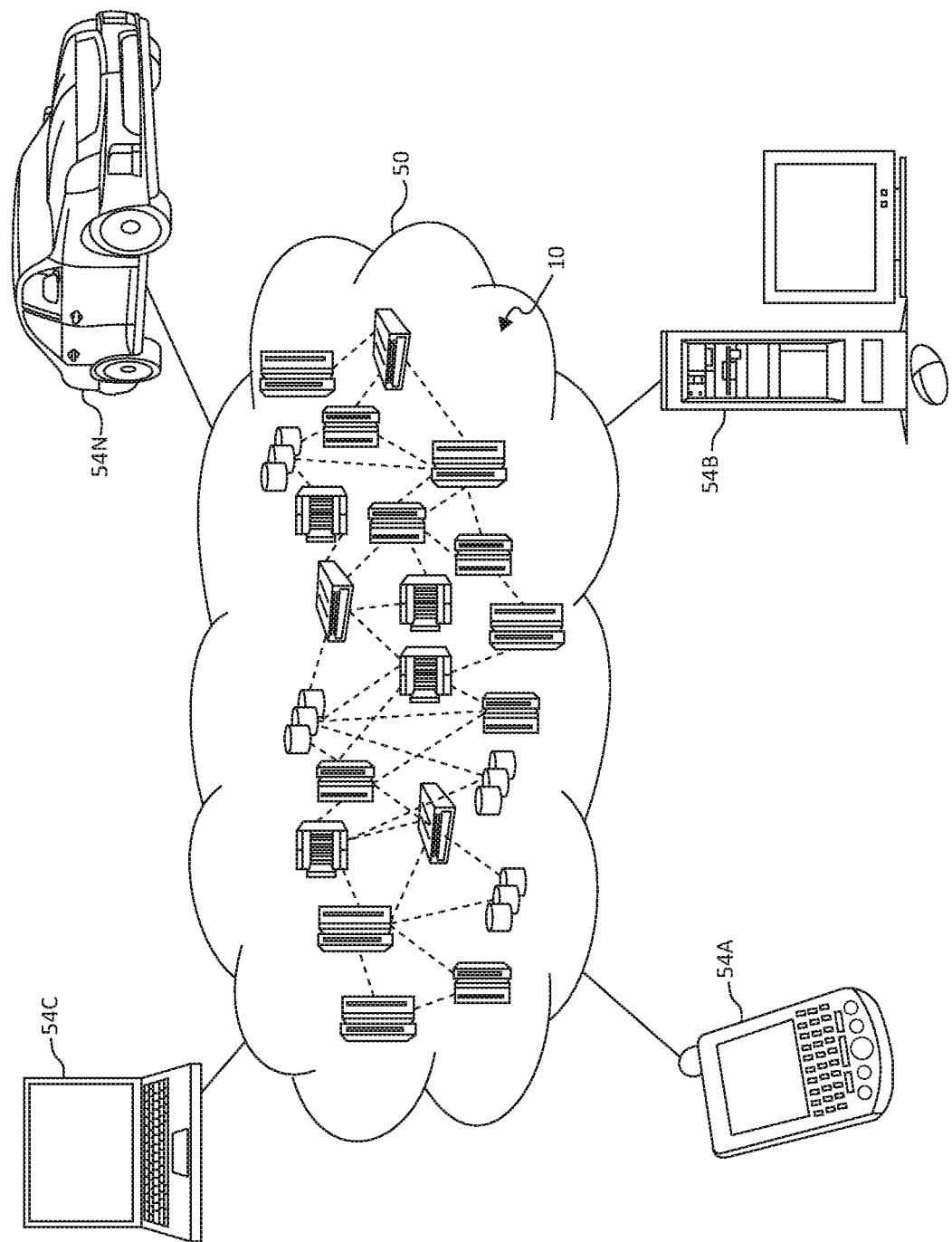
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C, and 54N shown in FIG. 2 are intended to be illustrative only and that computing nodes 10 and cloud computing environment 50 can communicate with any type of computerized device over any type of network and/or network addressable connection (e.g., using a web browser).

Figure 3:
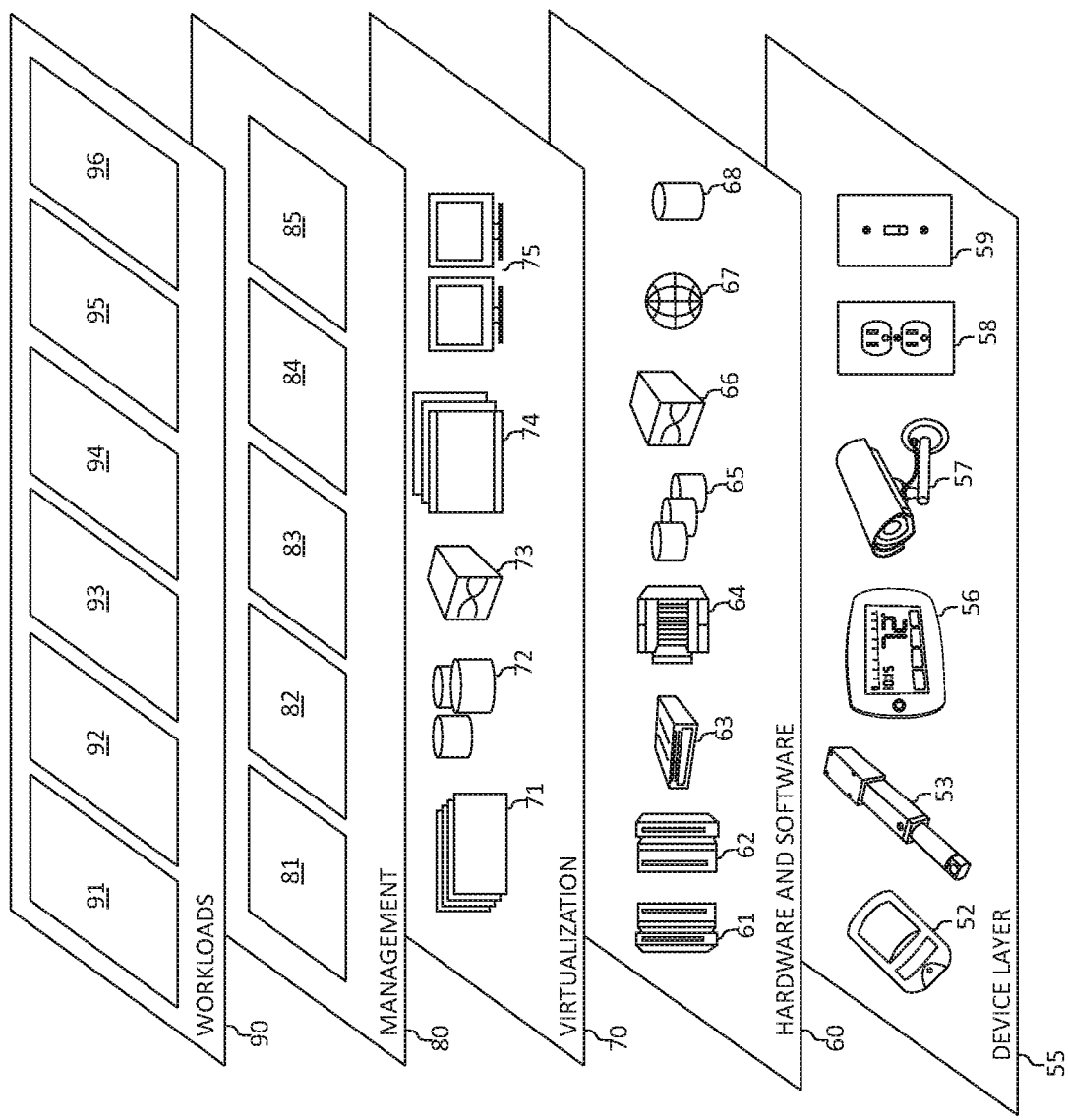
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various energy usage anomaly detection and fault diagnosis workloads and functions 96. In addition, energy usage anomaly detection and fault diagnosis workloads and functions 96 may include such operations as data analysis (including data collection and processing from various environmental sensors), and predictive data analytics functions. One of ordinary skill in the art will appreciate that the energy usage anomaly detection and fault diagnosis workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention provides for creation and application of learned energy usage models by exploiting a repeatable nature of each individual condenser energy output response signal. Accordingly, energy related performance anomalies of a condenser (e.g., a singular refrigeration pack condenser) may be cognitively determined based solely on the condenser's energy usage data (or accumulated data through and IoT enabled electrical energy metering infrastructure and ingestion of weather data (e.g., regional data of the condenser)). Energy related performance anomalies of a condenser may be cognitively determined based on a comparison operation with defined, standardized energy usage profiles of one or more condensers. A root cause analysis may be performed for one or more condensers with identified energy usage profile anomalies, based on application of a zonal dissection operation, and by comparison to a knowledge base of historical failure modes and problem resolution records. The energy usage/cost wastage may be estimated due to detected energy usage anomalies based on estimating the AUC ("Area Under the Curve") of an individual condenser profile against expected energy usage behavior standards and based on a geographical region operation of the condenser. Also, the condenser, refrigeration system pack type, HT or LT identification in the presence of submetering labelling ambiguity may be performed. Also, the present invention provides for a real-time operation mode using individual system usage models that enable estimation of changes in energy usage based on application of forecasted outside air temperature weather data and for early detection of equipment failures, by prediction, based on anomalous energy usage behavior detection for a condenser being transformed into manual mode of operation within a selected time period. In this way, the present invention overcomes the inability to access parametric data to assess system performance due to priority software and hardware components of a condenser by developing effective cognitive detection and analytics capabilities based on a single separately acquired data point.

Figure 4B:
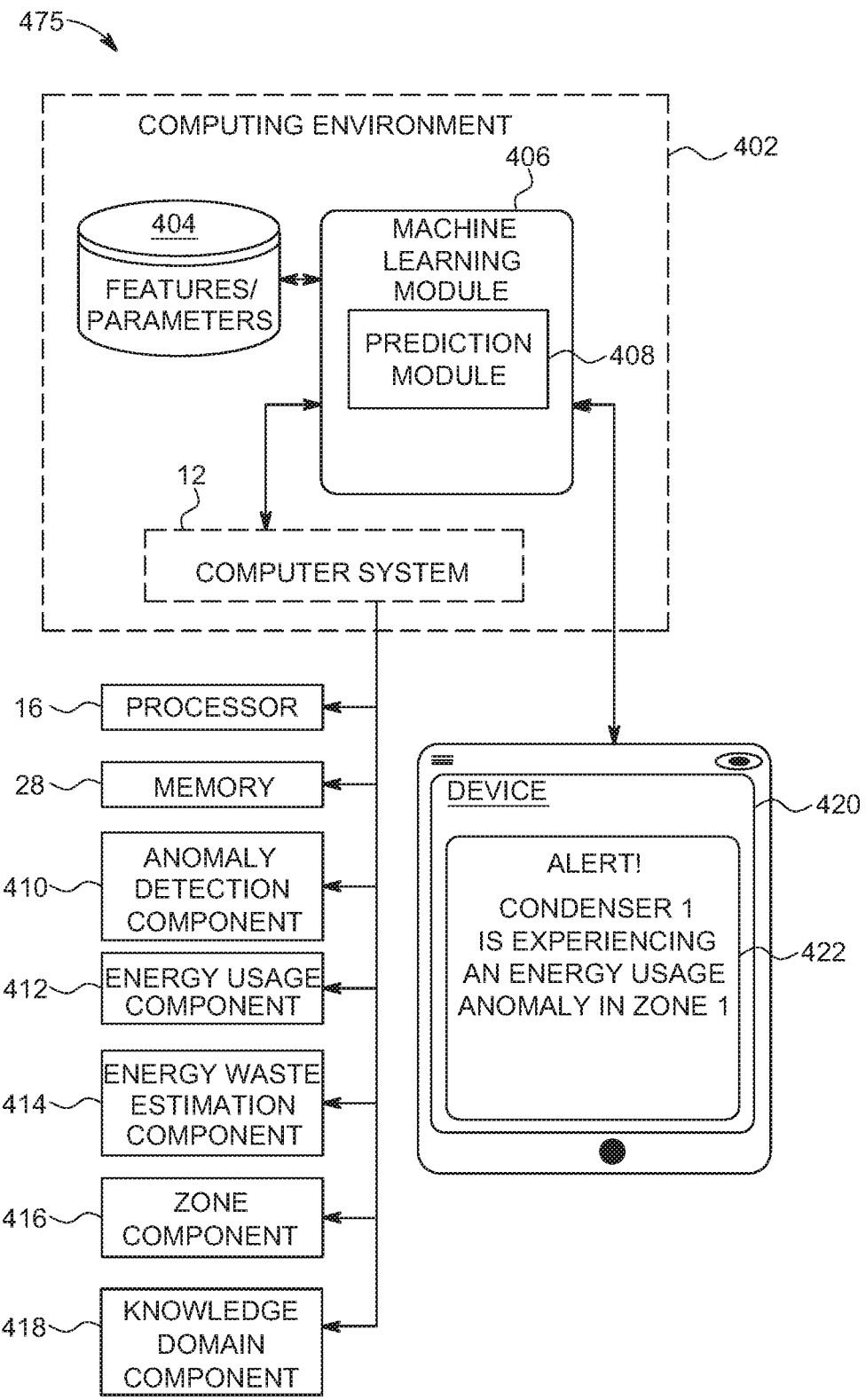

Turning now to FIGS. 4A-4B, block diagrams 400, 475 depicting exemplary functional components 400, 475 according to various mechanisms of the illustrated embodiments, are shown. FIG. 4A illustrates a block diagram of an exemplary refrigeration pack system 400 with an energy usage as compared to ("vs") OAT comparison graph. The energy usage vs. OAT graph 430 illustrates the OAT temperature on the X-axis in degrees Celsius and the hourly electrical usage on the Y-axis.

FIG. 4B illustrates an exemplary refrigeration pack system 475 with an energy usage anomaly detection and fault diagnosis and training of a machine-learning model in a computing environment, such as a computing environment 402 (e.g., a refrigeration pack such as refrigeration pack HT1 of FIG. 4A), according to an example of the present technology. As will be seen, many of the functional blocks may also be considered "modules" or "components" of functionality, in the same descriptive sense as has been previously described in FIGS. 1-3. With the foregoing in mind, the module/component blocks 475 may also be incorporated into various hardware and software components of a system for accurate temporal event predictive modeling in accordance with the present invention. Many of the functional blocks 475 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 475 may include the computing environment 402 (e.g., included in a refrigeration pack) and a device 420, such as a desktop computer, laptop computer, tablet, smart phone, and/or another electronic device that may have one or more processors and memory. The device 420 and the computing environment 402 may each be associated with and/or in communication with each other, by one or more communication methods, such as a computing network. In one example, the device 420 may be controlled by an owner, customer, or technician/administrator associated with the computing environment 402. In another example, the device 420 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4B, the computing environment 402 may include a machine learning module 406, and a features and/or parameters 404 (e.g., features, parameters, behavior that is associated with a machine learning module 406). The features and/or parameters 404 may also include energy usage profiles for each condenser and/or weather/temperature data received from one or more data sources (not shown for illustrative convenience). The features and/or parameters 404 may be a combination of features, parameters, behavior characteristics, energy usage profile data, weather/temperature data, historical data, tested and validated data, or other specified/defined data for processing that may be applied to the same input data relating to testing, monitoring, validating, detecting, analyzing and/or calculating various conditions or diagnostics relating to energy usage anomaly detection and fault diagnosis. That is, different combinations of parameters may be selected and applied to the same input data for learning or training one or more machine learning models.

The computing environment 402 may also include a computer system 12, as depicted in FIG. 1. The computer system 12 may also include the anomaly detection component 410, an energy usage component 412, an energy waste estimation component 414, a zone component 416, and a knowledge domain component 418 (e.g., a knowledge domain library and/or ontology) each associated with the machine learning module for training and learning one or more machine learning models and also for applying multiple combinations of features, parameters, behavior characteristics, energy usage profiles, or weather/temperature data, or a combination thereof to the machine learning model for cognitive energy usage anomaly detection and fault diagnosis.

In one aspect, the machine learning module 406 may include an estimation/prediction module 408 for predicting one or more energy usage anomalies and/or energy cost waste based on the energy usage anomalies that may be detected. For example, the computer system 12, using the anomaly detection component 410 and the energy usage component 412, may cognitively detect an energy usage anomaly in a condenser by comparing an energy usage profile of the condenser against a knowledge domain component 418 of energy usage standards and energy usage standards anomalies. The energy usage profile may be created, defined, stored, and maintained in the knowledge domain component 418, the features and/or parameters 404, or both.

In one aspect, the estimation/prediction module 408 may estimate/predict energy usage/cost waste based on the energy usage anomaly according to the comparison of the energy usage profile of the condenser against one or more energy usage standards associated with the knowledge domain component 418 of the energy usage standards and the energy usage standards anomalies and a location of the condenser. The machine learning module 406 may be initialized using feedback information to learn behavior of a condenser, an energy usage profile, and/or behavior patterns of the heat unit in one or more temperature zones. The condenser employing the computing environment 402 may be included in an Internet of Things (IoT) computing network.

The anomaly detection component 410 may cognitively detect the energy usage anomaly in one or more temperature zones, as defined by the zone component 416, of the condenser. That is, the zone component 416 may define the one or more temperature zones of each condenser. In conjunction with the features and/or parameters 404, the knowledge domain, the energy usage component, or a combination thereof, the zone component 416 may extract behavior parameters of the condenser in the one or more temperature zones to help diagnose the detected energy usage anomaly.

The energy waste estimation component 414 may cognitively determine or estimate an amount of energy waste for one or more condensers based on the detected energy usage anomaly. For example, the one or more suggestions may be provided to a graphical user interface (GUI), such as GUI 422, of the device 420.

The knowledge domain 418 may define one or more energy usage standards in the knowledge domain for testing and validating the energy usage anomalies, wherein a root cause analysis is performed for each one of the tested and validated energy usage anomalies.

In one aspect, the computing system 12 may preform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The device 420 may include a graphical user interface (GUI) 422 enabled to display on the device 420 one or more user interface controls for a user to interact with the GUI 422. For example, the GUI 422 may display the detected energy usage anomaly via an alert. For example, the detected energy usage anomaly or estimated/predicted energy usage waste event may be an alert that indicates or displays audibly and/or visually on the GUI 422 "ALERT! Condenser 1 is experiencing an energy usage anomaly in Zone 1!"

In one aspect, the cognitive energy usage anomaly detection and fault diagnosis and estimation/predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Figure 5A:
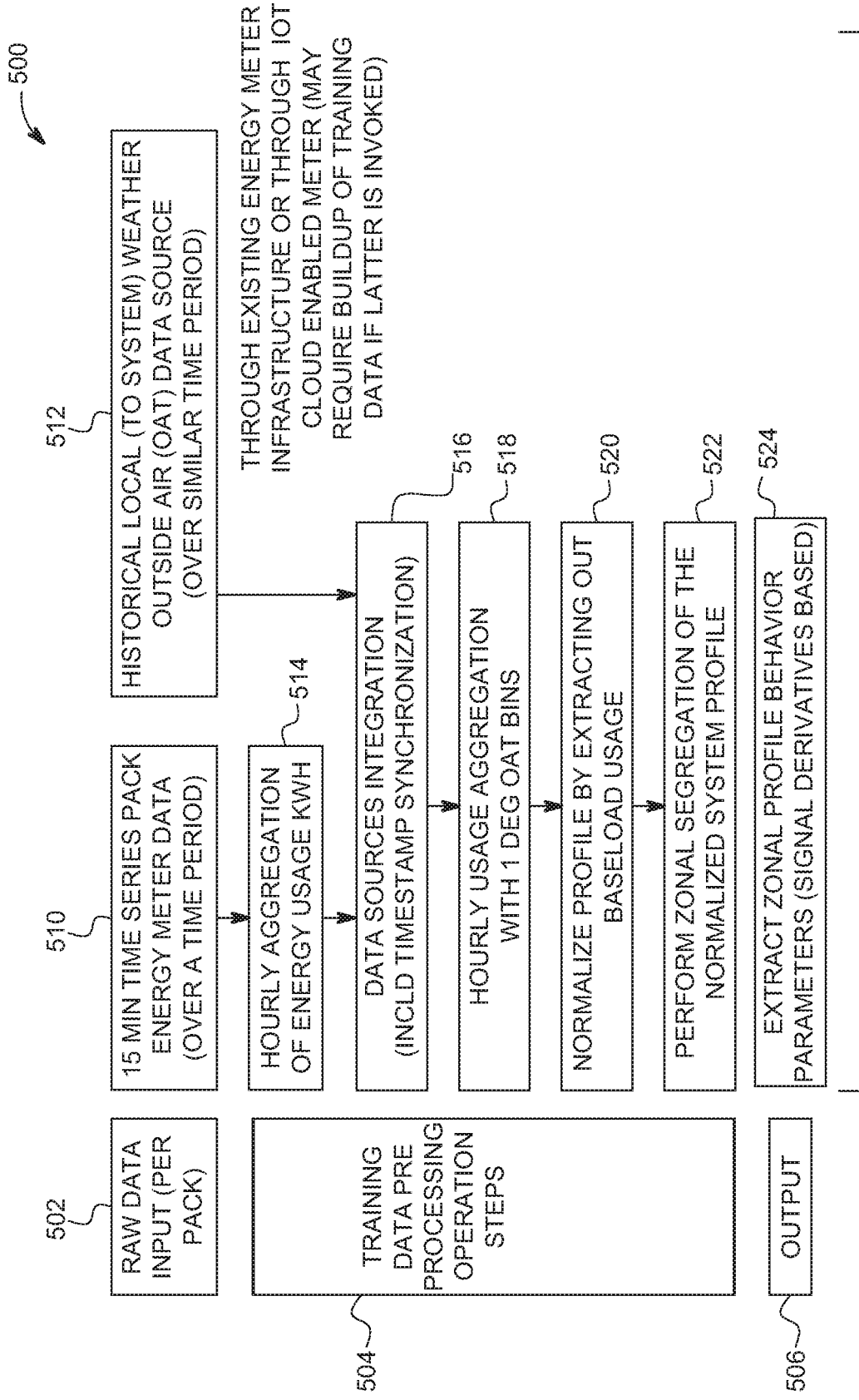
FIG. 5A-B is a flowchart diagram of an exemplary method for preprocessing and learning for fault diagnosis and analysis of a refrigeration condenser system by a processor, in which various aspects of the present invention may be realized.
Figure 5B:
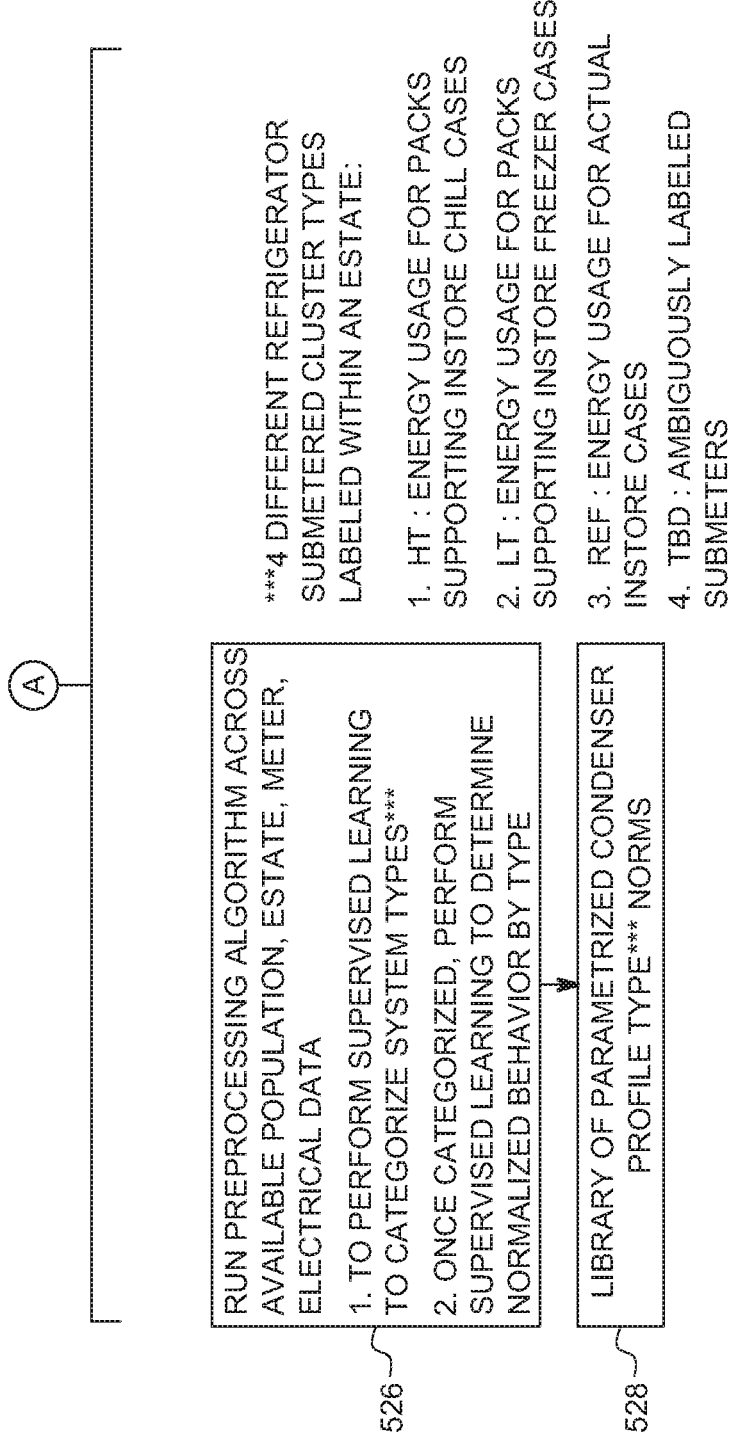
Figure 6:
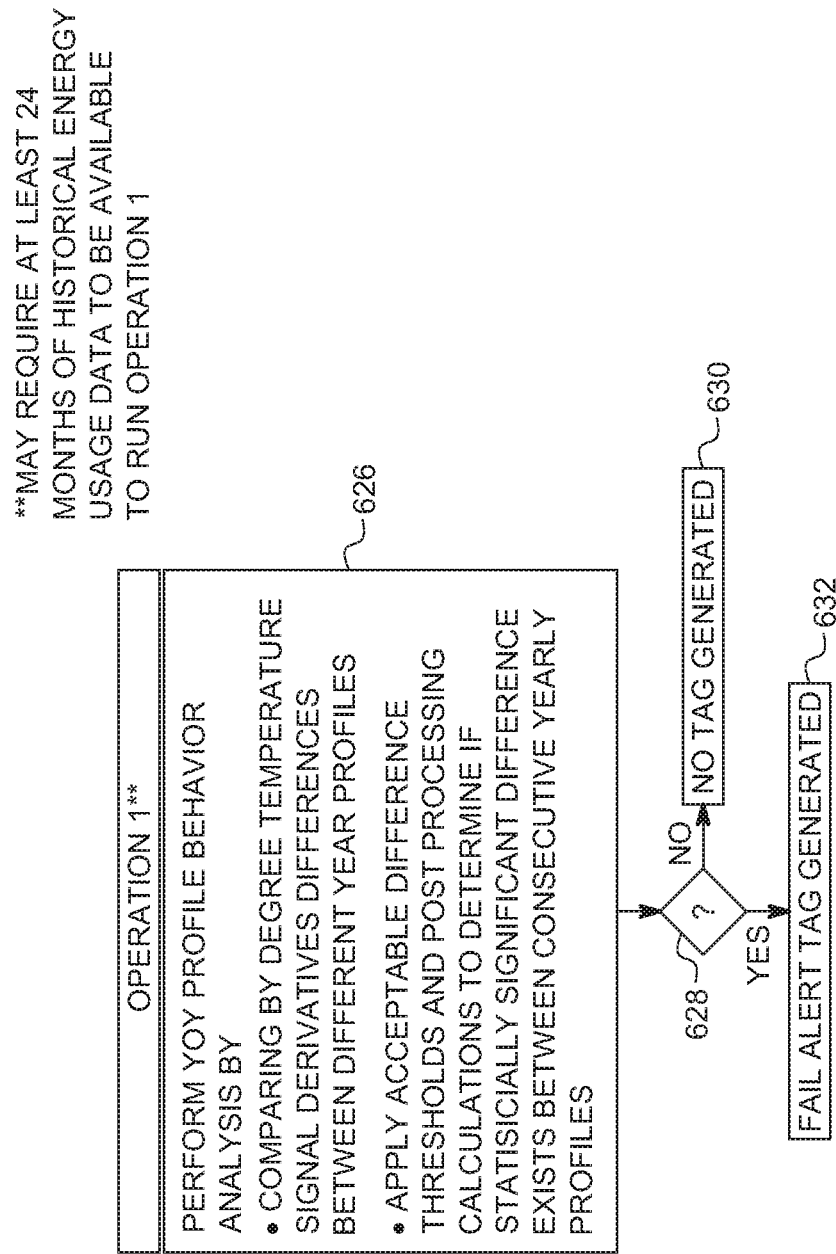
FIGS. 6 through 10 are additional flowchart diagrams of exemplary methods for fault diagnosis and analysis of a refrigeration condenser system by a processor, in which various aspects of the present invention may be realized.

Turning now to FIG. 5A-B, a method 500 for preprocessing and learning of refrigeration condenser system electrical usage behavior by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502 by data being received (e.g., "input") from one or more refrigeration packs. Training data may be preprocessed using a preprocessing operation, as in block 504. An output may be provided, as in block 506.

As part of functionality 500, block operations 502, 504, and 506 may include one or more of the following block operations. It should be noted that an energy meter infrastructure associated with the refrigeration pack may be initiated through an IoT computing network (e.g., an IoT-cloud enabled energy meter) to assist with training the collected/received data. Accordingly, condenser energy meter data may be collected and received over a selected period of time (e.g., 15 minute intervals), as in block 510. Historical outside air temperature ("OAT") data (which may be local to the condenser) may also be collected and received over a similar selected period of time, as in block 512. An aggregation of hourly energy usage of the refrigeration pack may be collected and received (e.g., energy usage of kilowatt hours "Kwh") over a selected period of time, as in block 514. From blocks 512 and 514, the collected data may be integrated together (including a timestamp synchronization), as in block 516. The hourly energy of usage aggregation may be performed with 1 degree OAT bins, where a bin is defined as the aggregation of pack energy usage divided over 1 degree outside air temperature intervals, as in block 518. An energy usage profile may be normalized by extracting out a baseload energy usage, as in block 520, in order to be able to use the generated profiles for comparative purposes later, given that all packs will have different baseloads and therefore have different y-axis intercepts which would make comparisons of profiles not unfeasible, and hence the need for this data preprocessing step. The normalized system profile may be segregated into zones ("zonal segregation"), as outlined earlier, as in block 522. The zonal profile behavior of the condenser may be extracted to assist in fault diagnosis. Condenser behavior may be parameterized as a review of the rate of change of energy usage dE (where dE is the change in energy usage) over 1 degree outside air temperature intervals dT, effectively calculating the 1st order derivatives $$\left(\text{e.g., 1st order derivative} = \frac{\partial E}{\partial T}\right),$$

as in block 524.

It should be noted that block operations 502, 504, and 506 may be preprocessing operations and may be applied to each operation of FIGS. 6-10. For example, prior to commencing each block operation of FIGS. 6-10, the functionality/operations of FIGS. 6-10 each may perform the preprocessing operations block operations 502, 504, and 506 of FIG. 5A.

The preprocessing operation may be performed across available population, estate, meter, and electrical data so as to 1) perform the supervised learning to categorize general normalized condenser energy usage behavior or 2) to perform the supervised learning to determine a (e.g., a defined or standardized behavior) condenser energy usage behavior by system types i.e. HT or LT systems, as in block 526. The parameterized heat exchange system types may be included/output in a knowledge base, as in block 528.

It should be noted for supervised learning, there may be four ("4") different refrigerator cluster types labeled within a refrigeration estate dataset: 1) "HT" labeled energy submeters relating to packs providing chill temperature cooling energy, 2) "LT" may be labeled as energy submeters relating to packs providing freezer temperature cooling energy, 3) "REF" may be labeled as energy submeters relating to total instore energy usage for the refrigeration cabinets themselves which includes the cabinet lighting and case fans and defrost heater electrical loads, and one or more other selected categories (e.g., other categories that may also include detecting usage behavior signatures are not standardized of either HT or LT types), and/or 4) "TBD" labeled submeter category such as, for example, submeters labeled RP1, R1. Here the label descriptors do not provide sufficient dissemination of submeter category and are categorized as TBD.

FIGS. 6 through 10 are additional flowchart diagrams of exemplary methods for fault diagnosis and analysis of refrigeration condenser systems by a processor, in which various aspects of the present invention may be realized. Methods 600, 700, 800, 900, and 1000 for fault diagnosis and analysis of refrigeration condenser systems by a processor are depicted, in which various aspects of the illustrated embodiments may be implemented. The functionality 600, 700, 800, 900, and 1000 may be implemented as a method executed as instructions on a machine, where the instructions are included on at least one computer readable medium or one non-transitory machine-readable storage medium.

The functionality 600 may perform operations 502, 504, and 506 of FIG. 5A for preprocessing operations. The functionality 600 may perform an operation such as, for example, "Operation 1" (e.g., a Year-On-Year ("YoY") energy usage profile behavior analysis of a condenser) by 1) comparing parameterized usage profiles from a condenser over a number of years (e.g., comparing, by degree, temperature signal derivatives differences between different year profiles) and/or 2) apply one or more acceptable difference thresholds and post processing calculations to determine if a defined statistical difference is present between consecutive year energy usage profiles, as block 626. For example, Operation 1 may generate a table for a selected year with two columns, where column 1 may be for a temperature bin from 5 degrees Celsius to 23 degree Celsius. Column 2 may be a series of calculated 1st order derivatives that equal the slope or "rate of change" in energy usage for that particular temperature bin for the selected year (having 19 slope values or rate of change distribution). A similar operation and distribution may occur for a selected, subsequent year. A comparison operation may compare the two different distributions of the slope value to determine a statistical difference (or difference in an identified rate of change energy usage signature for the particular condenser). A determination is performed to determine the presence of an energy usage anomaly, as in block 628. If no at block 628, no alert/tag is generated, as in block 630. If yes at block 628, a fail alert/tag is generated and may be issued, as in block 632. It should be noted that at least a selected time period (e.g., 24 months) of historical energy usage data is required in order to perform "Operation 1".

Figure 7:
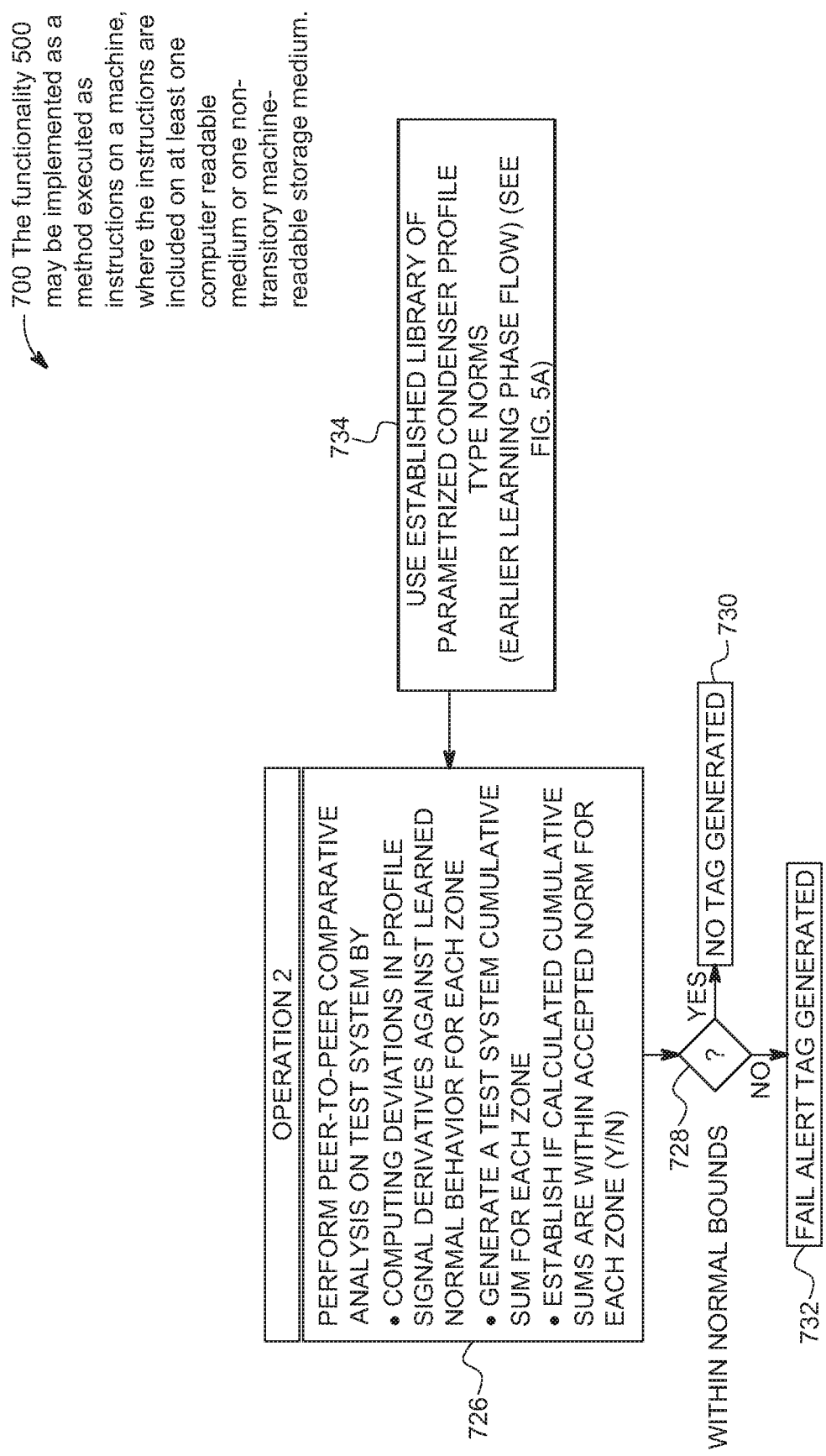

Turning now to FIG. 7, functionality 700 may perform operations 502, 504, and 506 of FIG. 5A for preprocessing operations. The functionality 700 may perform an operation such as, for example, "Operation 2" and may perform a peer-to-peer comparative analysis on a test condenser system by 1) computing one or more deviations in the energy usage profile signal derivatives against learned, normalized/standard behavior for each zone, 2) generating one or more test system cumulative sums for each zone, and/or 3) determine/establish if the one or more test system cumulative sums that may be determined/calculated are within accepted standards of deviations (e.g., within a defined standard/norm for each zone), as in block 726. A determination may be performed to determine whether the one or more test system cumulative sums are within accepted standards of deviations, as in block 728. If yes at block 728, no alert/tag is generated, as in block 730. If no at block 728, a fail alert/tag may be generated and may be issued, as in block 732. Also, as part of and/or in parallel with block 726, a library/knowledge domain of parameterized condenser profile standards (e.g., defined or learned normal or standards of earlier learning operations) may be used to perform Operation 2, as in block 734.

Figure 8:
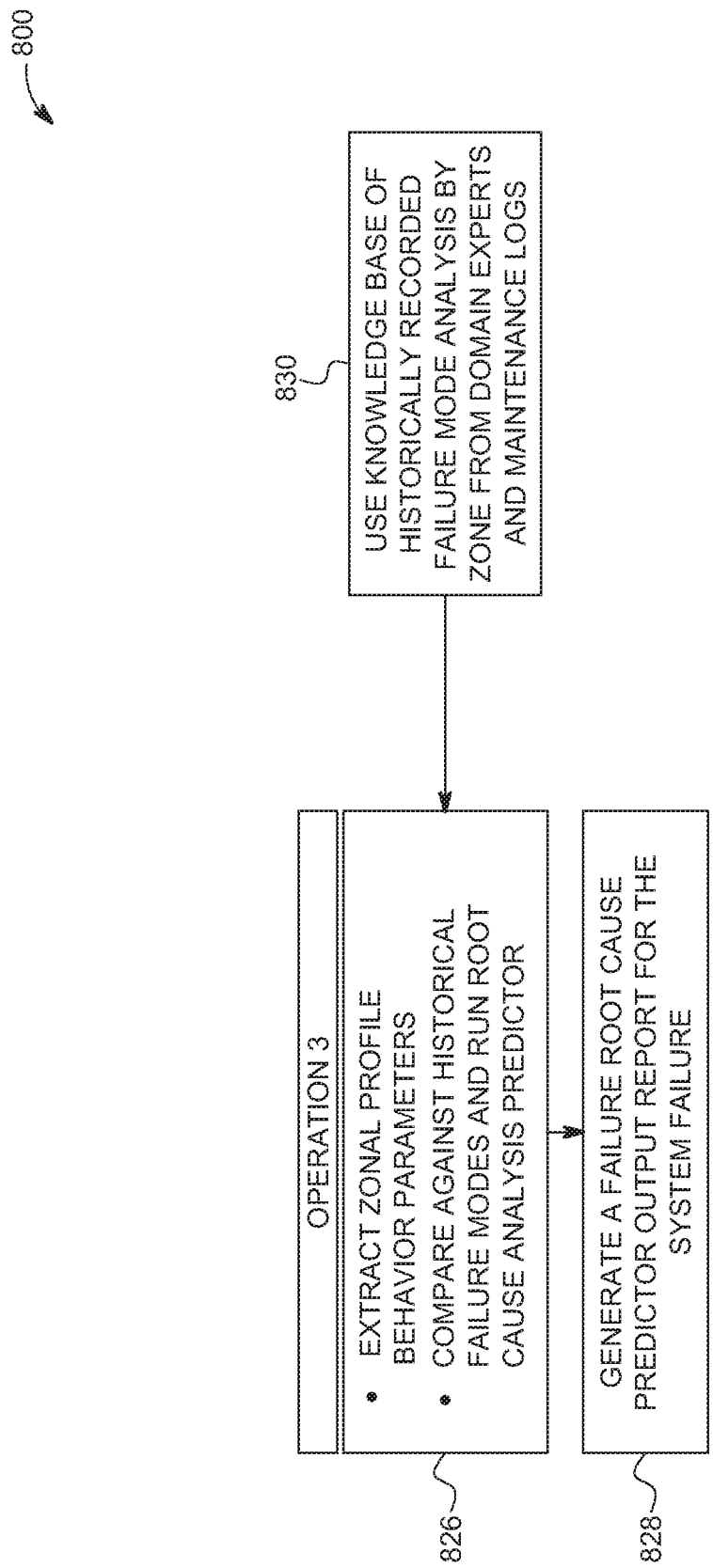

Turning now to FIG. 8, functionality 800 may perform operations 502, 504, and 506 of FIG. 5A for preprocessing operations. The functionality 800 may perform an operation such as, for example, "Operation 3" and may 1) extract one or more zonal profile behavior parameters/characteristics and/or 2) compare the one or more zonal profile behavior parameters/characteristics against historical energy usage failure modes (which may exist for each individual zone) and a root cause analysis and prediction operation may be performed, as block 826. A failure diagnosis and root cause analysis prediction/estimation may be generated and provided in an output report for a condenser having a detected energy usage anomaly, as in block 828. A knowledge base of the historical recorded failure mode analysis per zone from one or more domain experts and maintenance logs may be used and/or updated, as in block 830.

Figure 9:
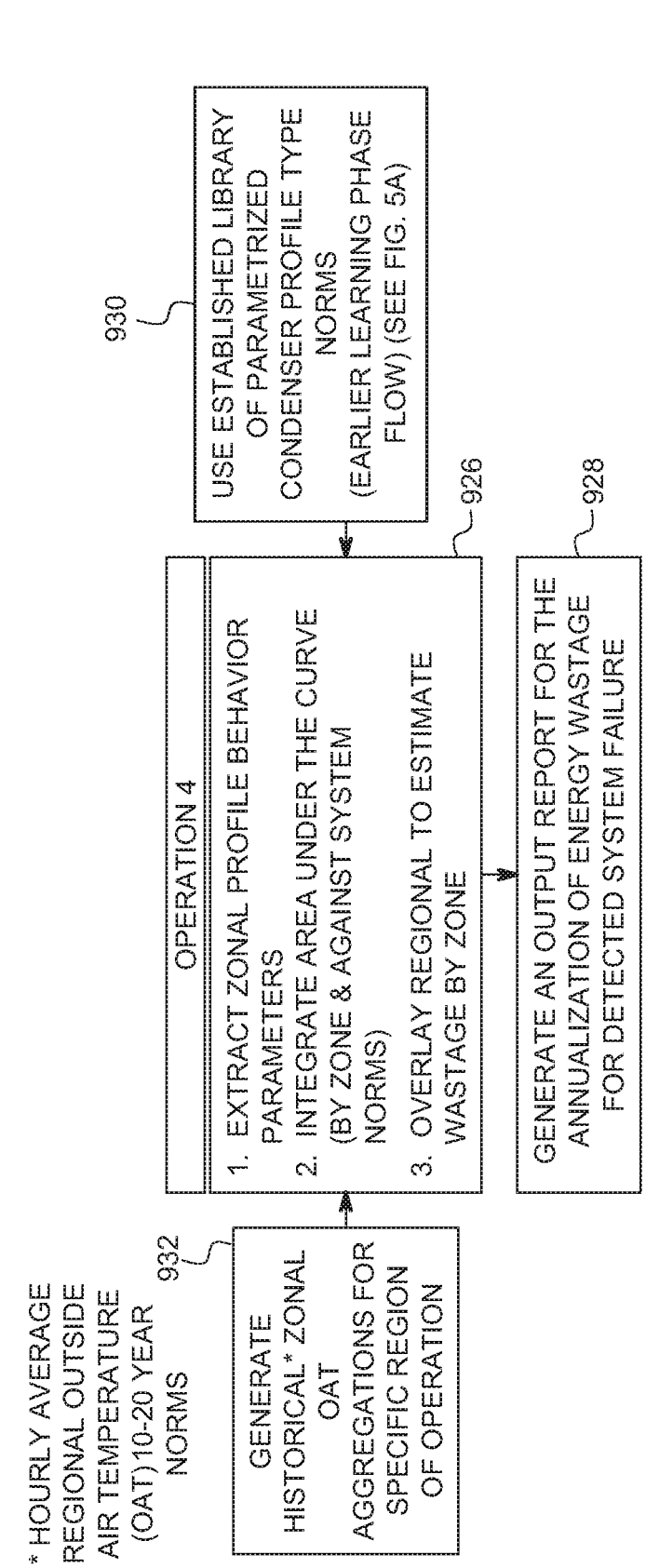

Turning now to FIG. 9, functionality 900 may perform operations 502, 504, and 506 of FIG. 5A for preprocessing operations. The functionality 900 may perform an operation such as, for example "Operation 4" and may 1) extract one or more zonal profile behavior parameters/characteristics, 2) integrate an area under the curve (AUC) for each zone, and reference against established/defined energy usage standards stored in the knowledge domain, and/or 3) estimate an energy usage waste by zone (e.g., overlay regional to estimate the energy usage waste by zone), as block 926. That is, the energy cost wastage can be determined by estimating the AUC of an individual condenser profile compared against a library of expected energy usage behavior standards (e.g., a library of standardized or normalized behavior standards), inputted from block 930, and/or estimated based on a historical operation outside temperature norms for the geographical region, inputted from block 932, taken from a region where the condenser physically resides. It should be noted that the hourly temperature (e.g., regional OAT) may be over a defined period of time (e.g., 10-20 year averages/standards). An energy usage waste report may be generated and provided in an output report (e.g., a report is generated for the annualization of energy wastage for a detected energy usage anomaly in a condenser), as in block 928.

Figure 10:
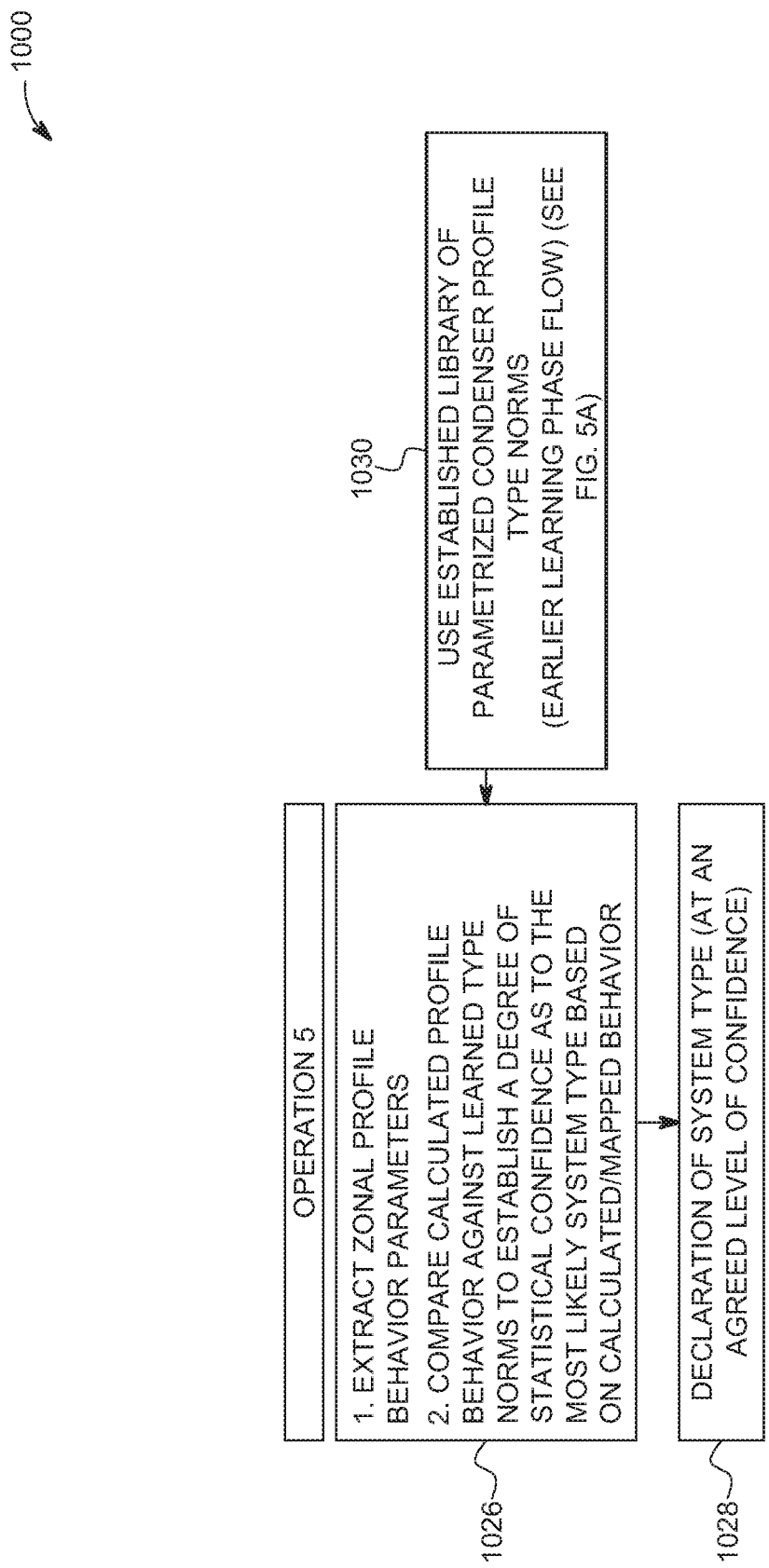

Turning now to FIG. 10, functionality 1000 may perform operations 502, 504, and 506 of FIG. 5A for preprocessing operations. The functionality 1000 may perform an operation such as, for example, "Operation 5" and may 1) extract one or more zonal profile behavior parameters/characteristics and/or 2) compare the one or more zonal energy usage profile behaviors against learned, standardized energy usage profiles to establish a degree or threshold of statistical confidence (e.g., a percentage or statistic above a threshold) as to a most likely (e.g., greater than a defined percentage or threshold) refrigeration pack type based on calculated and/or mapped energy usage behavior, as block 1026. A declaration or indication of the refrigeration pack energy usage type may be issued (e.g., at an agreed/defined confidence level), as in block 1028. A knowledge domain may be provided with and/or updated with parameterized condenser profile type standards (which may be defined and learned in a learning phase as illustrated in FIG. 5A), as in block 1030.

Figure 11:
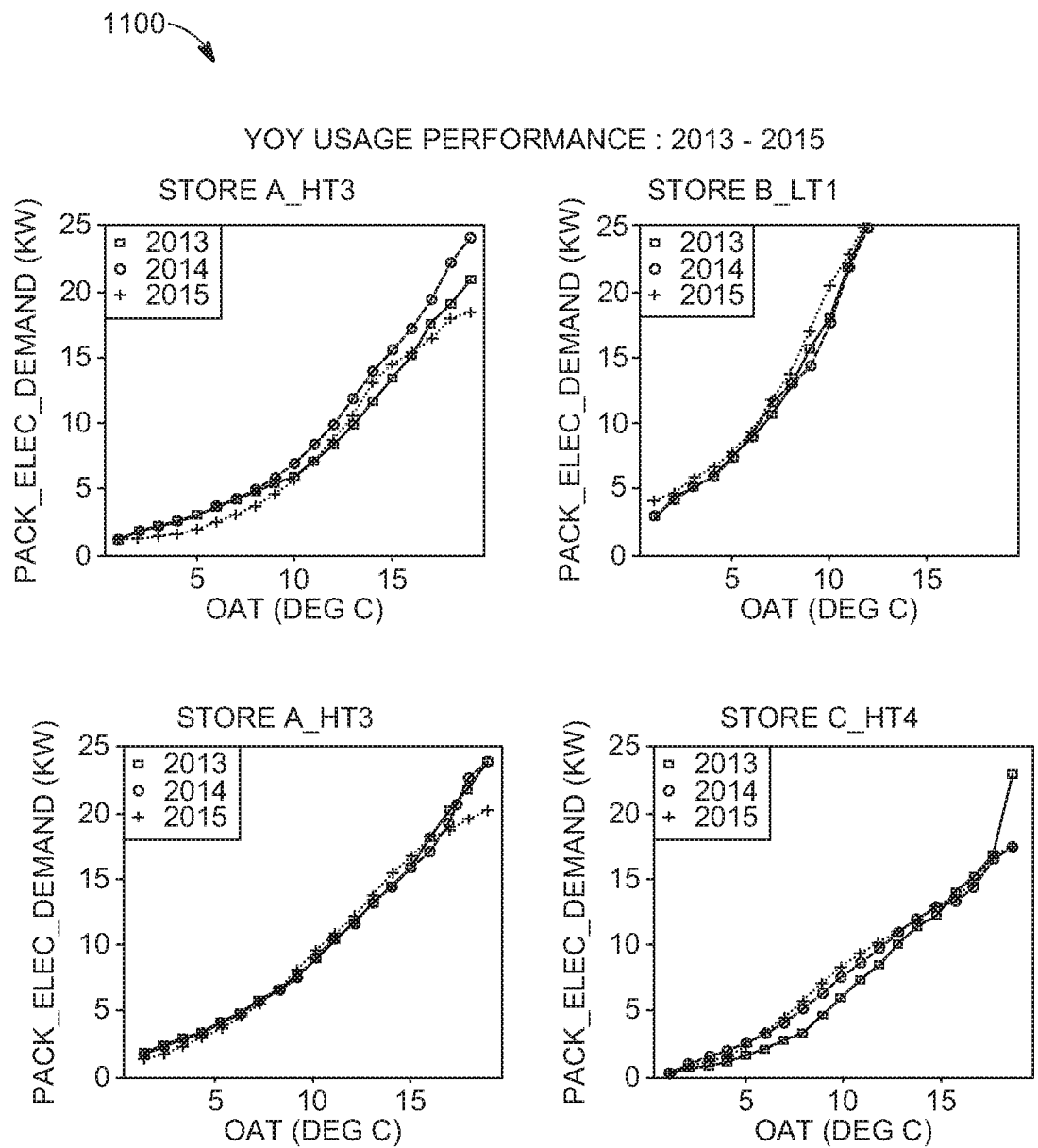
FIG. 11 are graphs depicting examples of repeatable behaviors of a refrigerator condenser system in accordance with aspects of the present invention.

FIG. 11 is a graph 1100 depicting examples of unique and repeatable year-on-year ("YOY") energy usage profiles as a function of OAT for individual condenser systems, such as store A_HT3, store B_LT1, and/or store C_HT4. Specifically, graph 1100 depicts four various condensers over a selected time period (e.g., years 2013-2015) with the X-axis showing the OAT in degrees Celsius (C) and the energy usage in kilowatts depicted on the Y-axis.

Figure 12:
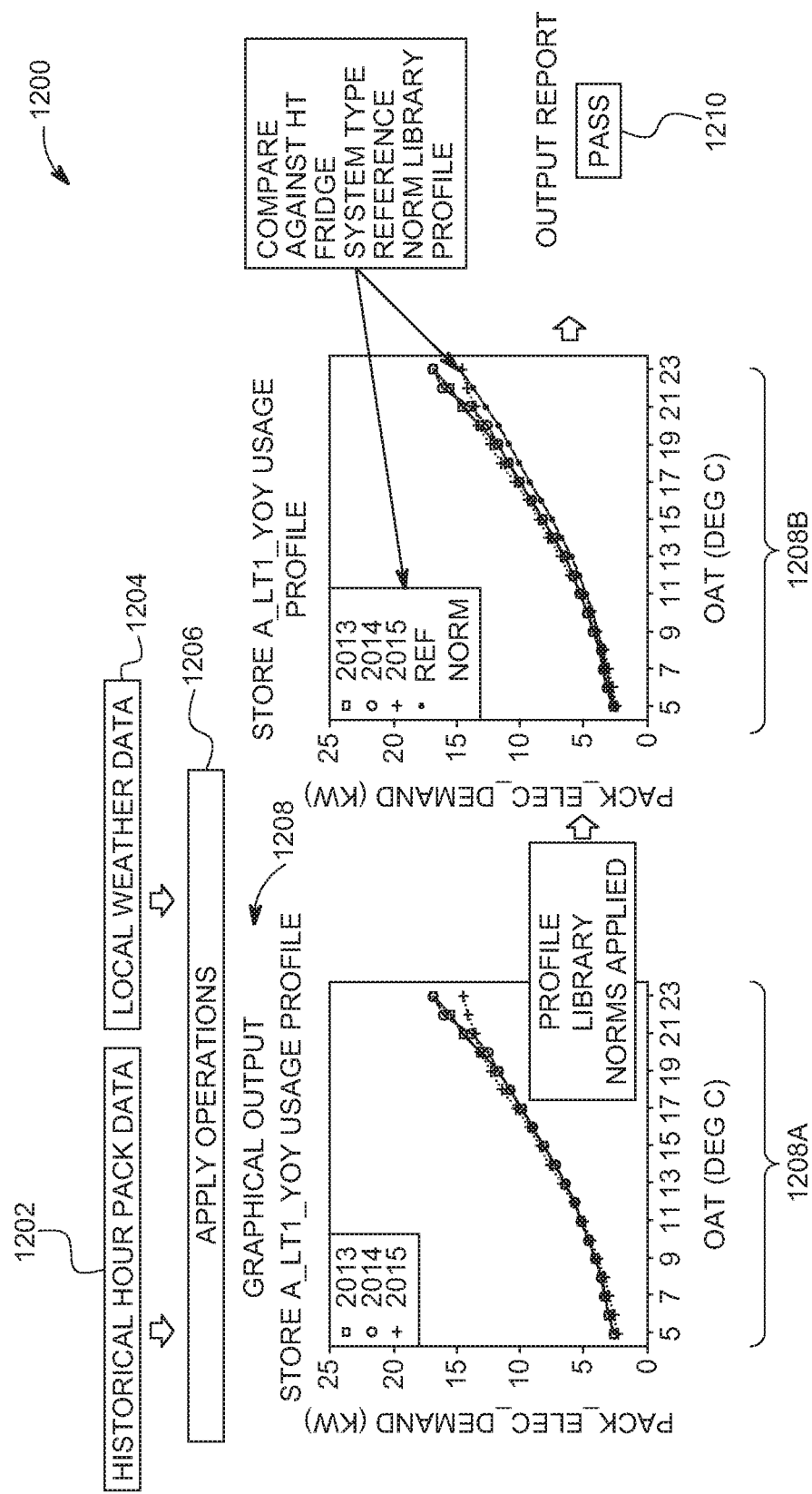
FIG. 12 is a block flow diagram of output results of fault diagnosis and analysis of a refrigeration condenser system in accordance with aspects of the present invention.

FIG. 12 is a block flow diagram of output results ("pass") of fault diagnosis and analysis of a refrigeration condenser system in a peer-to-peer anomaly detection. As shown, the various blocks of functionality are depicted with arrows designating the blocks' 1200 relationships with each other and to show process flow. Additionally, descriptive information is also seen relating each of the functional blocks 1200. As will be seen, many of the functional blocks may also be considered "modules" of functionality, in the same descriptive sense as has been previously described in FIG. 12. With the foregoing in mind, the module blocks 1200 may also be incorporated into various hardware and software components of a system for image enhancement in accordance with the present invention. Many of the functional blocks 1200 may execute as background processes on various components, either in distributed computing components, or on the user device, or elsewhere, and generally unaware to the user performing generalized tasks of energy usage anomaly detection in a condenser.

Starting with blocks 1202 and 1204 a historical collection of weather data and/or condenser ("refrigeration pack") data may be received and used by one or more energy usage anomaly detection operations (see Operation 2 of FIG. 7), as in block 1206. For example, an energy usage anomaly may be cognitively detected in a condenser by comparing an energy usage profile of the refrigeration pack against the knowledge base determined in the learning phase (and/or over a selected period of time such as, for example, over the years 2013-2015). A graphical output(s) (e.g., 1208A, 1208B) illustrating the results of the operation may be generated, as in block 1208. An output report (e.g., a repeatable YOY energy usage profile for store A_LT1) may also be generated such as, for example, a "pass" indication (e.g., an energy usage anomaly not detected), as in block 1210.

Figure 13:
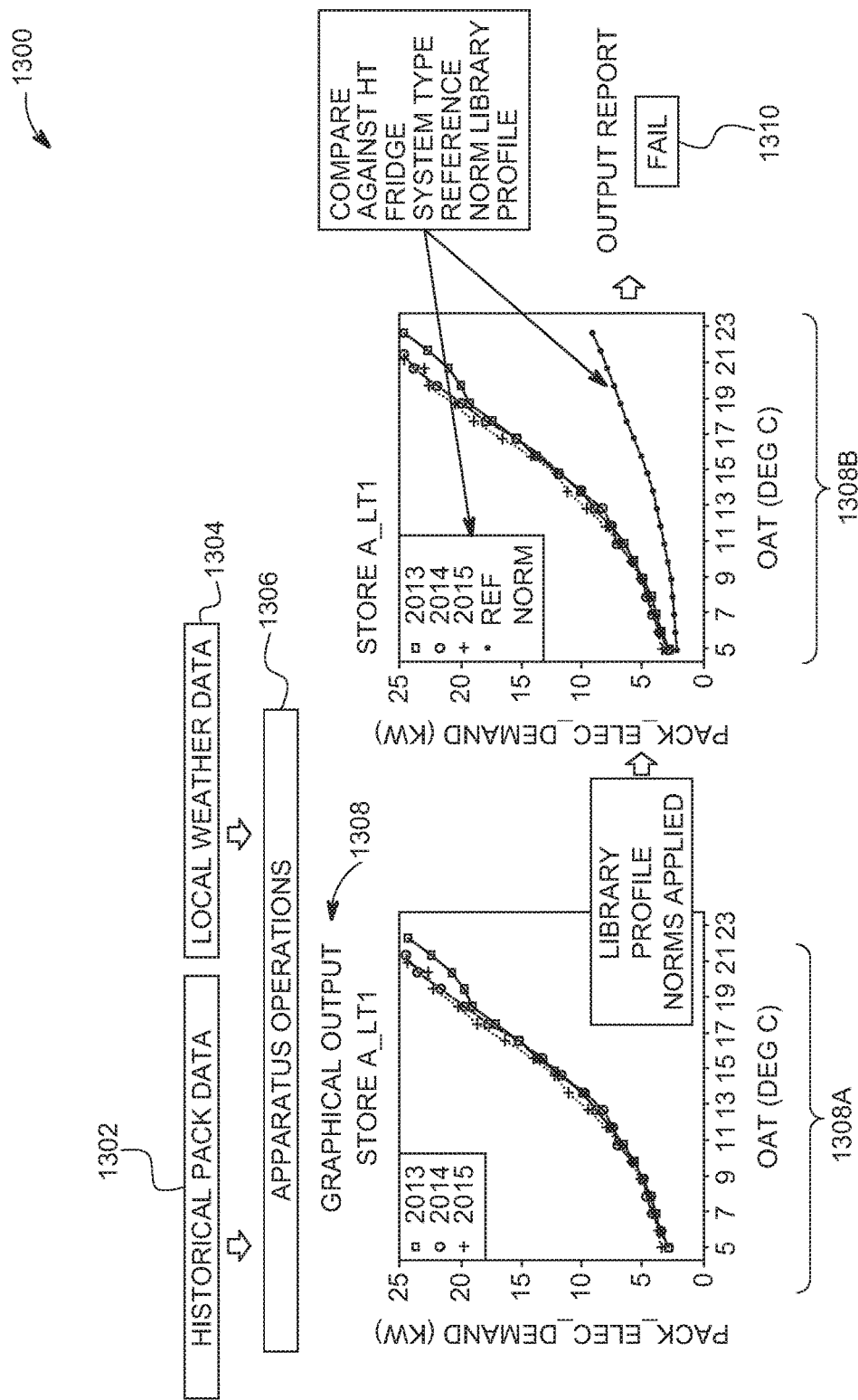
FIG. 13 is a block flow diagram of output results of fault diagnosis and analysis of a refrigeration condenser system in accordance with aspects of the present invention.

FIG. 13 is a block flow diagram of output results (fail) of fault diagnosis and analysis of a refrigeration condenser system. FIG. 13 is a block flow diagram of output results of fault diagnosis and analysis of a refrigeration condenser system in a peer-to-peer anomaly detection scenario. As shown, the various blocks of functionality are depicted with arrows designating the blocks' 1300 relationships with each other and to show process flow. Additionally, descriptive information is also seen relating each of the functional blocks 1300. As will be seen, many of the functional blocks may also be considered "modules" of functionality, in the same descriptive sense as has been previously described in FIG. 13. With the foregoing in mind, the module blocks 1300 may also be incorporated into various hardware and software components of a system for image enhancement in accordance with the present invention. Many of the functional blocks 1300 may execute as background processes on various components, either in distributed computing components, or on the user device, or elsewhere, and generally unaware to the user performing generalized tasks of energy usage anomaly detection in a condenser.

Starting with blocks 1302 and 1304, a historical collection of weather data and/or refrigeration pack energy data may be received and used by one or more energy usage anomaly detection operations (see Operation 2 of FIG. 7), as in block 1306. For example, an energy usage anomaly may be cognitively detected in a condenser by comparing an energy usage profile of the condenser against a knowledge domain of energy usage standards and energy usage standards anomalies (and/or over a selected period of time such as, for example, over the years 2013-2015). A graphical output(s) (e.g., 1308A, 1308B) (e.g., a YOY energy usage profile for store A_LT1) illustrating the results of the operation may be generated, as in block 1308. An output report may also be generated such as, for example, a "fail" indication (e.g., an energy usage anomaly detected), as in block 1310.

Figure 14:
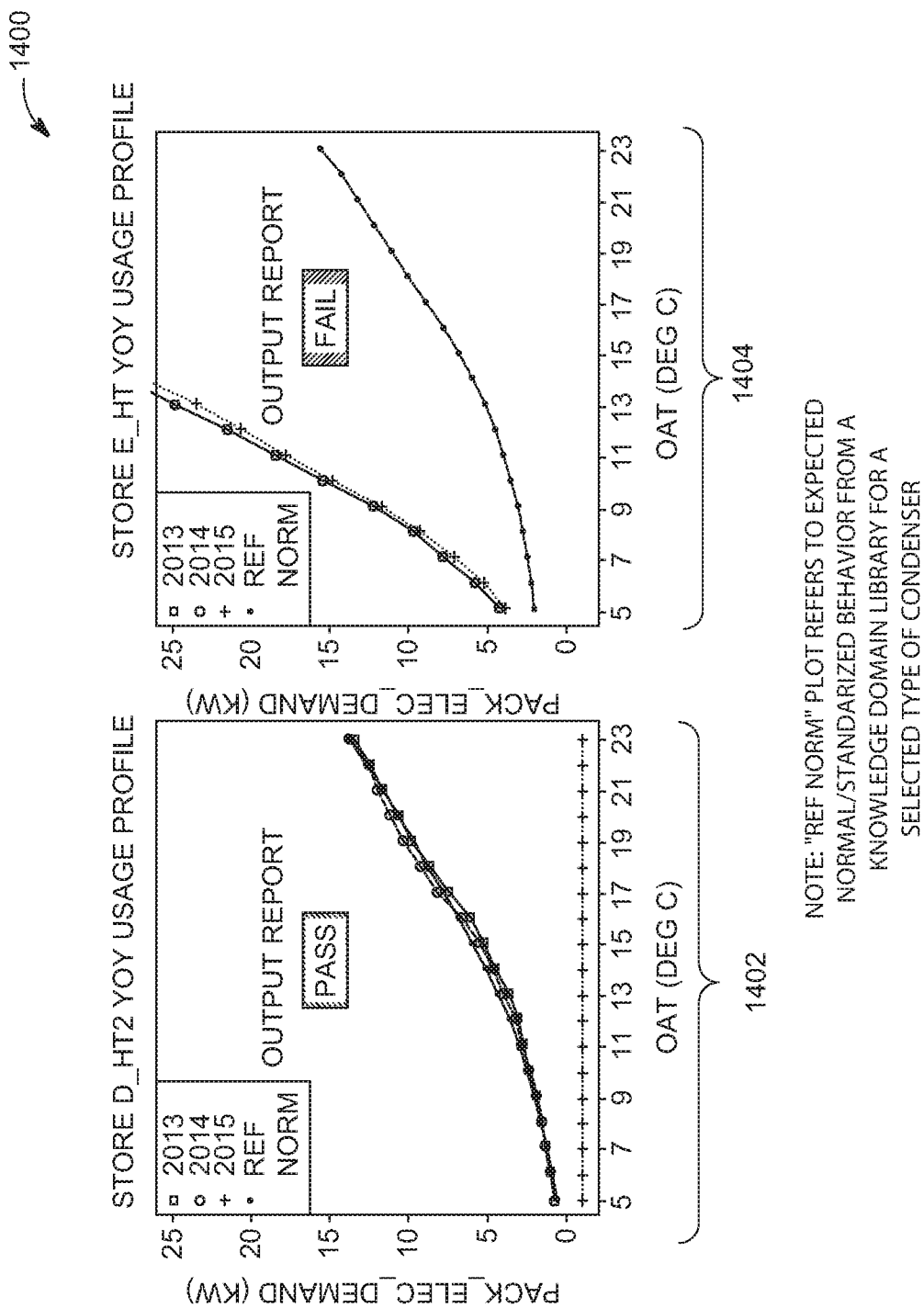
FIG. 14 are graph diagrams of output results of fault diagnosis and analysis of a refrigeration condenser system in accordance with aspects of the present invention.

FIG. 14 are graph diagrams 1400 of output results of fault diagnosis and analysis of historical collection of weather data and refrigeration pack energy data in a peer-to-peer anomaly detection scenario. Specifically, graph diagrams 1402 and 1404 show two different condensers with the X-axis showing the OAT in degrees Celsius (C) and the energy usage in kilowatts depicted on the Y-axis. Graph 1402 shows a first condenser having an output report (see FIG. 12) (e.g., a YOY energy usage profile for store D_HT2) with a "pass" report. Graph 1404 shows a second condenser having an output report (see FIG. 13) (e.g., a YOY energy usage profile for store E_HT) with a "fail" report, which means an energy usage anomaly has been detected for the second condenser.

Figure 15:
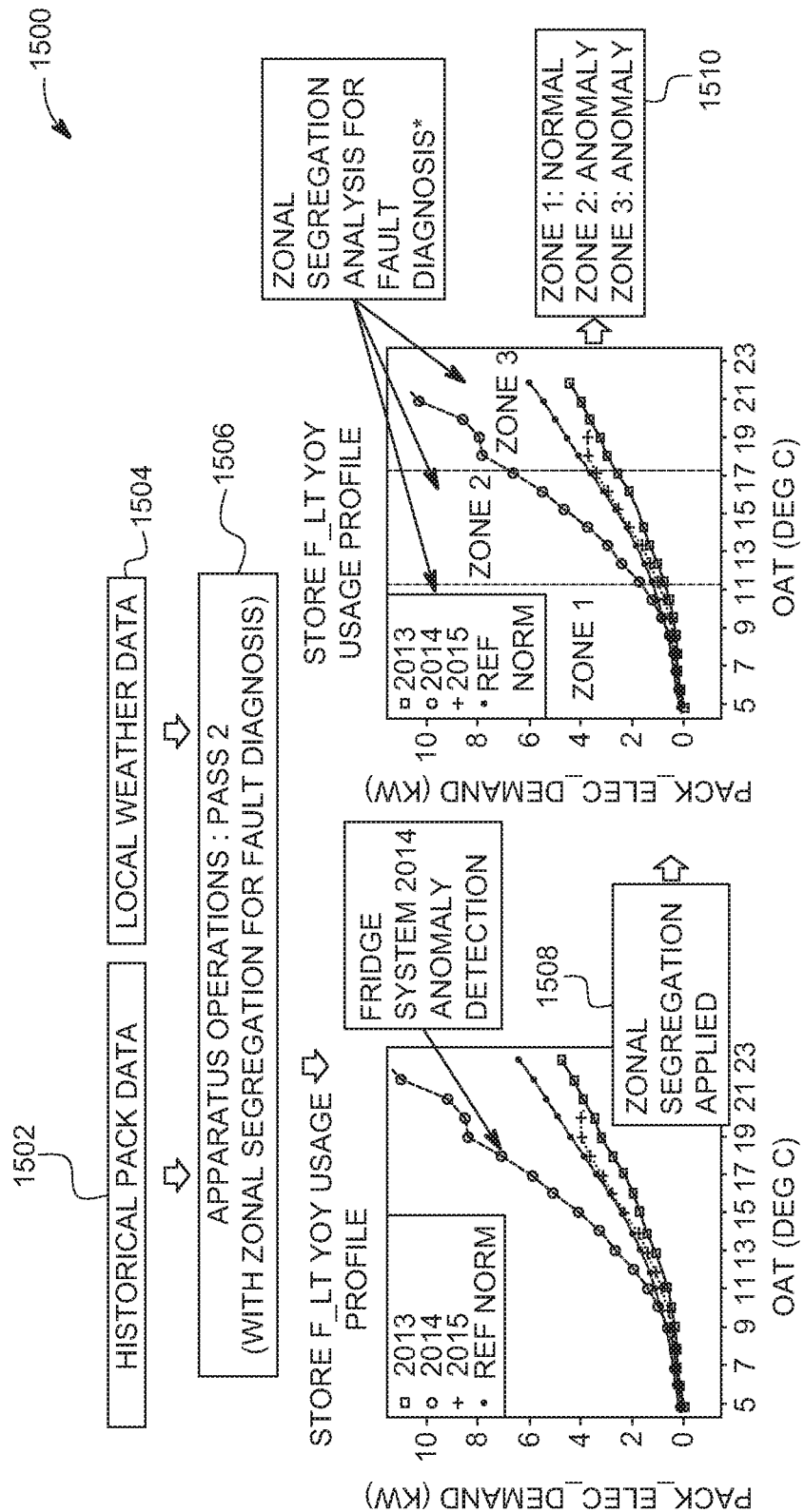
FIG. 15 is an additional block flow diagram of anomaly detection with fault diagnosis of a refrigeration condenser system in accordance with aspects of the present invention.

FIG. 15 is an additional block flow diagram of anomaly detection with fault diagnosis of a refrigeration condenser system. As shown, the various blocks of functionality are depicted with arrows designating the blocks' 1500 relationships with each other and to show process flow. Additionally, descriptive information is also seen relating each of the functional blocks 1500. As will be seen, many of the functional blocks may also be considered "modules" of functionality, in the same descriptive sense as has been previously described in FIG. 15. With the foregoing in mind, the module blocks 1500 may also be incorporated into various hardware and software components of a system for image enhancement in accordance with the present invention. Many of the functional blocks 1500 may execute as background processes on various components, either in distributed computing components, or on the user device, or elsewhere, and generally unaware to the user performing generalized tasks of energy usage anomaly detection in a condenser.

Starting with blocks 1502 and 1504, a historical collection of weather data and refrigeration pack electrical energy usage data may be received and used by one or more energy usage anomaly detection operations with zonal segregation for fault diagnosis (see Operation 1 of FIG. 6 and Operation 3 of FIG. 8), as in block 1506. For example, an energy usage anomaly (for a YOY energy usage profile for store F_LT) may be cognitively detected in a condenser by comparing an energy usage profile of the condenser against a knowledge domain of energy usage standards and energy usage standards anomalies (and/or over a selected period of time such as, for example, over the years 2013-2015), detecting the energy usage anomaly in one or more temperature zones of the condenser, defining the one or more temperature zones, and/or extracting behavior parameters of the condenser in the one or more temperature zones for detecting the energy usage anomaly. A regional temperature zone boundaries presented for the embodiment may be for a selected geographical region, as follows Zone 1 boundary: 75% of annualized hours of condenser operating below historical hourly outside air temperature of 12 degrees centigrade, Zone 2 boundary: 25% of annualized condenser operating hours in historical outside temperatures between 12 and 18 degrees centigrade, and/or Zone 3 boundary: 5% of annualized condenser operating hours above historical hourly outside air temperature of 18 degrees centigrade. Further embodiments for other geographical locations may require ingestion of appropriate historical regional outside air temperature profiles.

A zonal segregation operation may be applied to each condenser, as block 1508. A zonal segregation analysis may be provided for fault diagnosis and/or energy usage anomaly detection, as in block 1510. For example, the results may indicate that "zone 1" has no fault diagnosis and/or no detected energy usage anomaly (e.g., "normal" operation). However, zones 2 and 3 may show results indicating a fault diagnosis and/or detected energy usage anomaly (e.g., "anomaly" detected).

Figure 16:
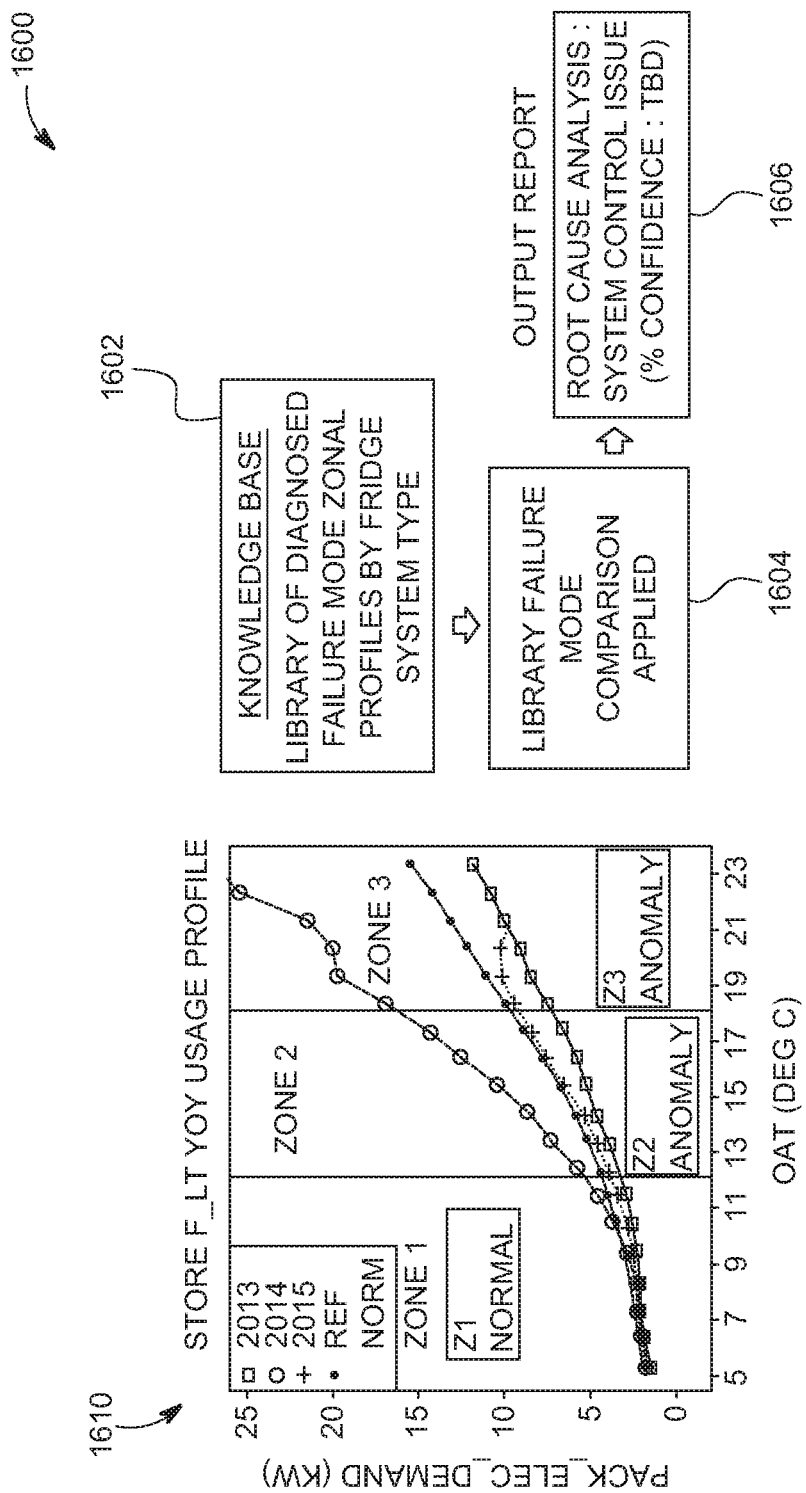
FIG. 16 is an additional block flow diagram of anomaly detection with fault diagnosis of a refrigeration condenser system in accordance with aspects of the present invention.

Turning now to FIG. 16, a block flow diagram 1600 is depicted of anomaly detection with fault diagnosis of a refrigeration condenser system of energy usage zonal profiles 1610 (e.g., a YOY energy usage profile for store F_LT). As shown, the various blocks of functionality are depicted with arrows designating the blocks' 1600 relationships with each other and to show process flow. Additionally, descriptive information is also seen relating each of the functional blocks 1600. As will be seen, many of the functional blocks may also be considered "modules" of functionality, in the same descriptive sense as has been previously described in FIG. 16. With the foregoing in mind, the module blocks 1600 may also be incorporated into various hardware and software components of a system for image enhancement in accordance with the present invention. Many of the functional blocks 1600 may execute as background processes on various components, either in distributed computing components, or on the user device, or elsewhere, and generally unaware to the user performing generalized tasks of energy usage anomaly detection in a condenser.

Starting with block 1602, a knowledge domain (knowledge base) of diagnosed energy usage failure modes of zonal profiles according to condenser type (e.g., refrigeration system type, nominally HT and LT types) may be accessed. Using the accessed energy usage failure modes of zonal profiles according to condenser type, a comparison operation may be performed to compare the current refrigeration pack energy usage profile by zone to the energy usage failure modes of zonal profiles assessed from the knowledge domain, as in block 1604. An output report may be generated with a root cause analysis declaration of each zone, as in block 1606 (e.g., root cause analysis may include a confidence level above a defined percentage rate as the issue causing the condenser energy usage anomaly).

For example, the root cause reasoning operation based on a zonal analysis of the energy usage profiles 1610 may be based on rate of change derivatives (e.g., high rate above a defined threshold or value) that may be observed (and calculated) over a selected period of time (e.g., year 2014) in a selected zone (e.g., in Zone 2) as compared to a previously determined standardized or "normal" energy usage profile during an alternative selected time period (e.g., year 2013) and an additional alternative selected time period return that has returned to standardized or "normal" energy usage profile so as to determine system failure (e.g., a control failure or fan failure). As depicted in FIG. 16 by way of example only, the use case of failure, such as a hardware fan failure mode, is manifested as Zone 3's rate of change increases, and therefore a control issue is presented as most likely root cause in the example use case.

Figure 17:
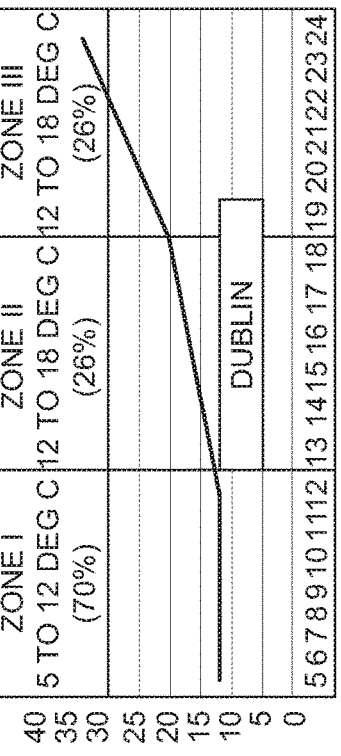
FIG. 17 is an additional block flow diagram of estimation of energy cost wastage due to detected energy usage anomalies of a refrigeration condenser system in accordance with aspects of the present invention.
Figure 17:
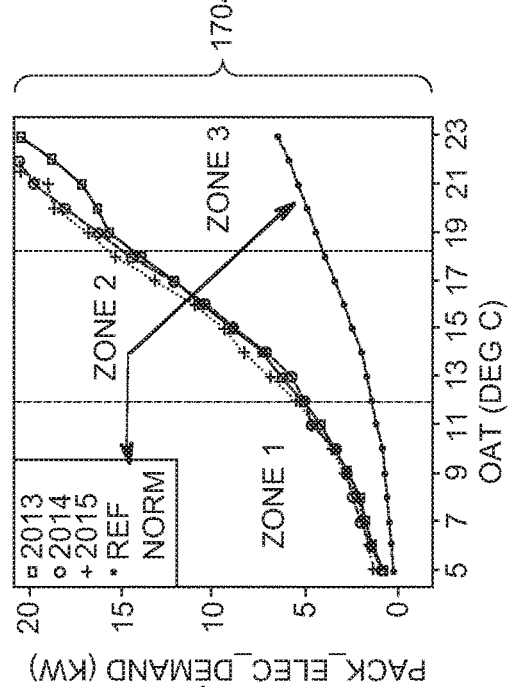
Figure 17:
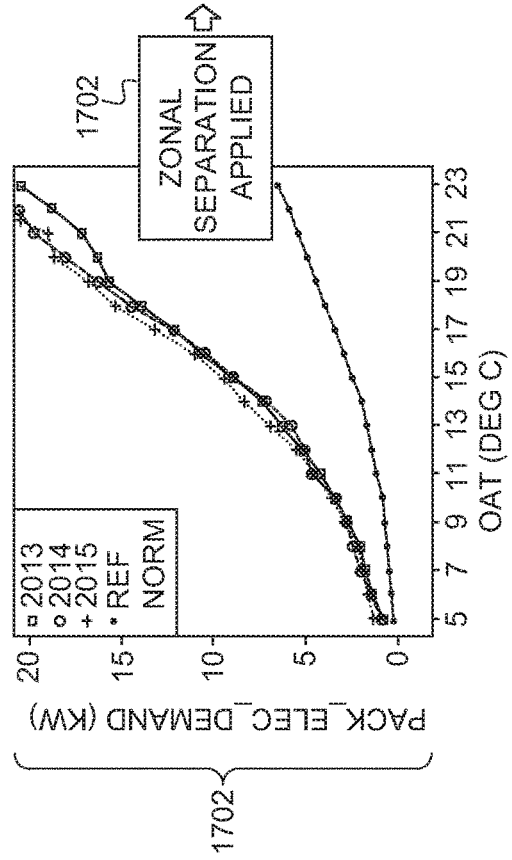

FIG. 17 is an additional graph diagram 1700 of estimation of energy cost wastage due to detected energy usage anomalies of a refrigeration condenser system. As depicted, graph 1700 illustrates the historical (e.g., 20-year period) regional weather analysis for a condenser operating in a defined region (e.g., a YOY energy usage profile for store G_LT1). The condenser may be segregated by applying a zonal separation operation, as in step 1702, into zonal regions by temperature over the selected time period (e.g., 2013-2015), as depicted in graphs 1704A-B. Using graphs 1704A-B, Zone 1 illustrates that for historical geographical region outside air temperature performance normal/standards or "norms", the OAT hourly average is expected to be less than 12 degree Celsius for a selected period of time (e.g., 6570 hours or 75% of the time). Zone 2, using graphs 1704A-B, illustrates that the OAT is expected to be 12 to 18 degree Celsius for a selected period of time (e.g., 1752 hours or 20% of the time). Zone 3 illustrates that the OAT is expected to be greater than 18 degrees Celsius for a selected period of time (e.g., 350 hours or 5% of the time), as indicated in graphs 1704A-B.

Figure 18:
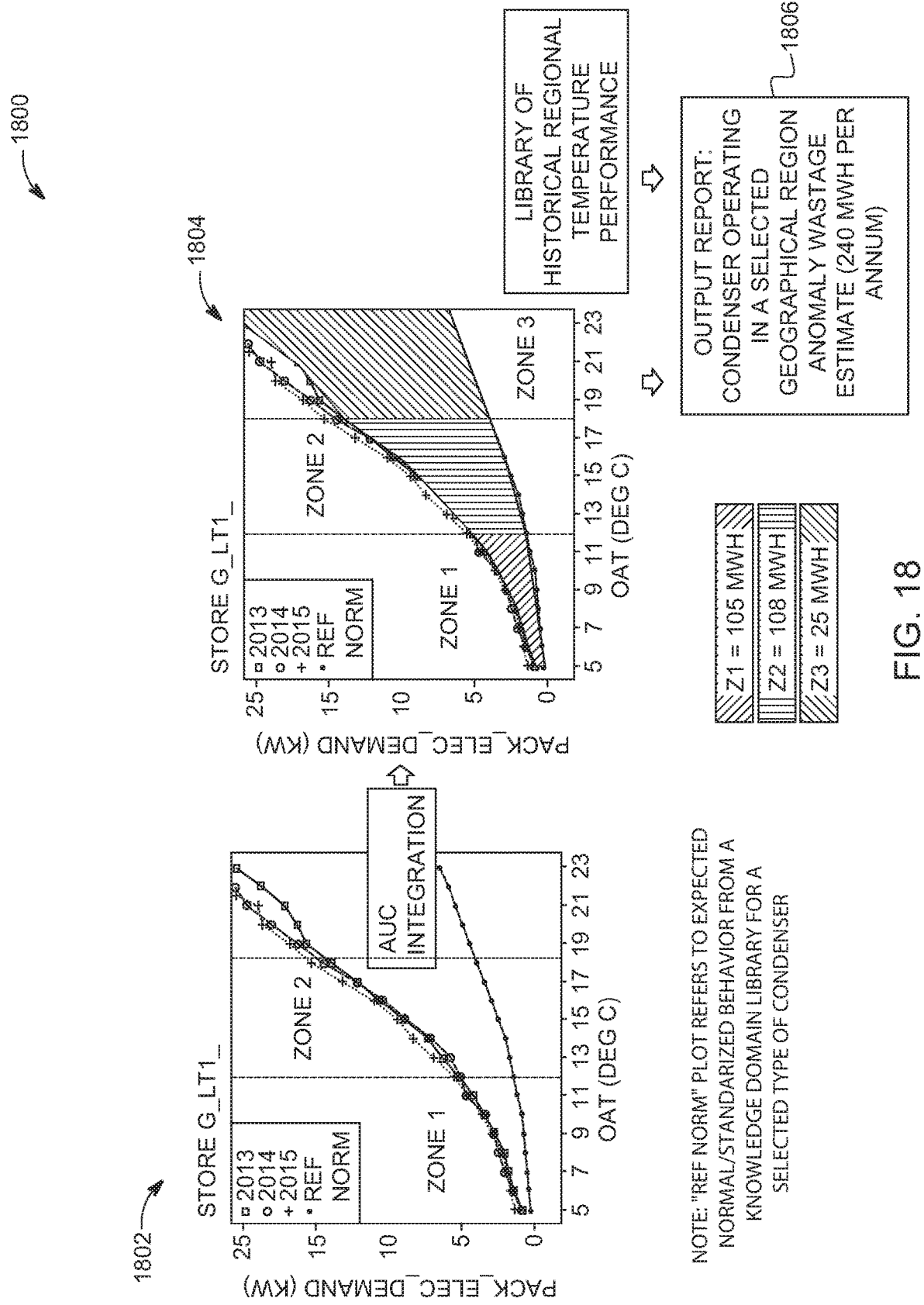
FIG. 18 is an additional block flow diagram of estimation of energy cost wastage due to detected energy usage anomalies of a refrigeration condenser system in accordance with aspects of the present invention.

FIG. 18 is an additional block flow diagram of estimation of energy cost wastage due to detected energy usage anomalies of a refrigeration condenser system. As depicted, graph 1800 illustrates graph 1802 being divided into zones and graph 1804 depicts the results of integrating an area under the curve (AUC) by each zone and against established/defined energy usage standards stored in the knowledge domain, and/or estimating an energy usage waste by zone (e.g., overlay regional to estimate the energy usage waste by zone). As a result, for example, Zone 1 "Z1" may illustrate an annualized energy usage wastage estimate of 105 Megawatt hours (Mwh) for the targeted condenser (e.g., a YOY energy usage profile for store G_LT1) operating in Z1 in a given year, Zone 2 "Z2" may illustrate an annualized energy usage wastage estimate of 108 Megawatt hours (Mwh) for the targeted condenser operating in Z2 in a given year, and Zone 3 "Z3" may illustrate an annualized energy usage wastage estimate of 25 Megawatt hours (Mwh) for the targeted condenser operating in Z3 in a given year. Therefore, an output report may indicate, estimate, and/or predict that the energy wastage estimate of a condenser operating in a selected geographical region such as, for example, 240 Mwh per annum, which in turn may be monetized by multiplying by the Kwh unit cost, as in block 1806.

Figure 19:
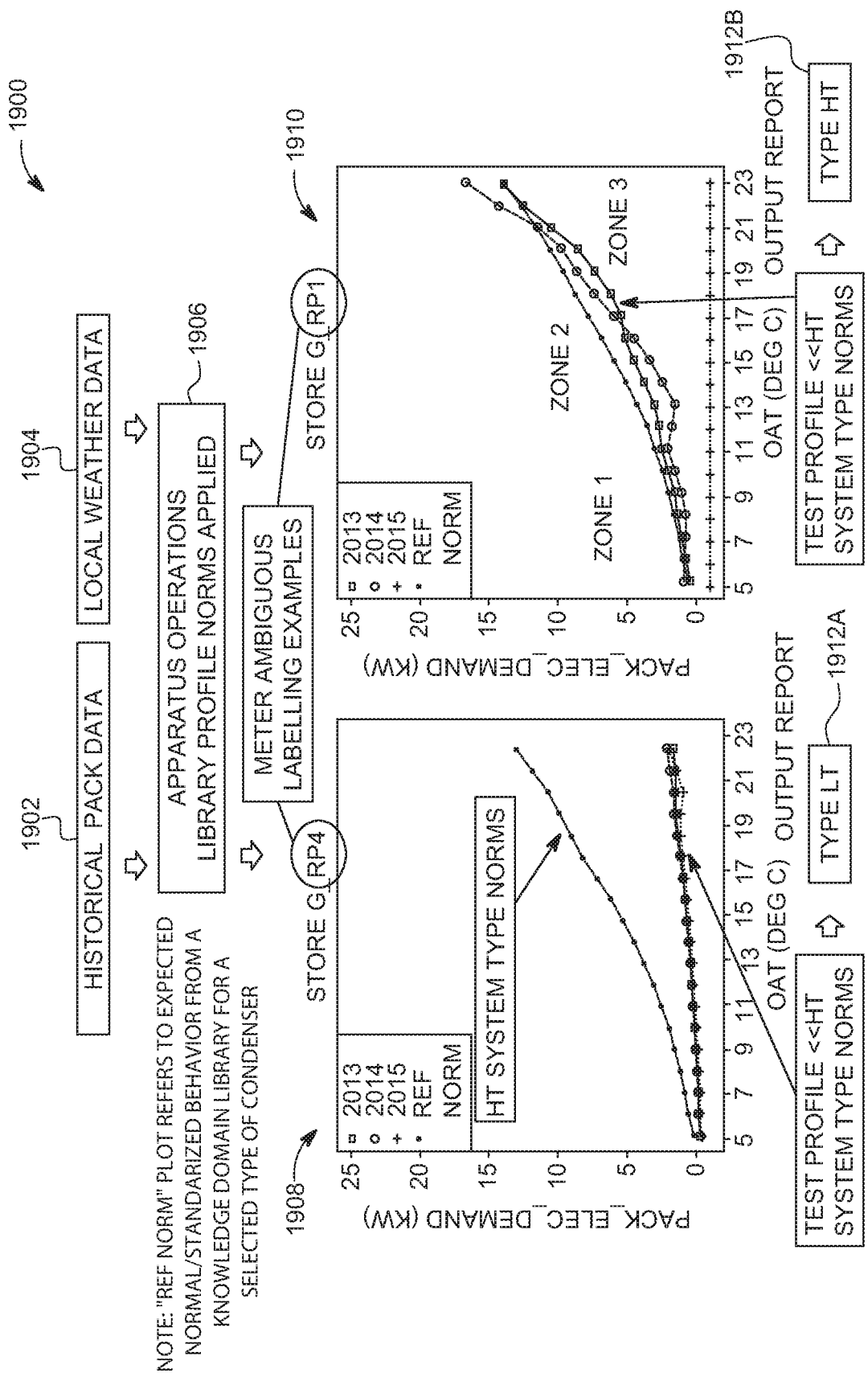
FIG. 19 is an additional block flow diagram of metering labelling disambiguation in accordance with aspects of the present invention.

FIG. 19 is an additional block flow diagram of metering labelling disambiguation. As shown, the various blocks of functionality are depicted with arrows designating the blocks' 1900 relationships with each other and to show process flow. Additionally, descriptive information is also seen relating each of the functional blocks 1900. As will be seen, many of the functional blocks may also be considered "modules" of functionality, in the same descriptive sense as has been previously described in FIG. 19. With the foregoing in mind, the module blocks 1900 may also be incorporated into various hardware and software components of a system for image enhancement in accordance with the present invention. Many of the functional blocks 1900 may execute as background processes on various components, either in distributed computing components, or on the user device, or elsewhere, and generally unaware to the user performing generalized tasks of energy usage anomaly detection in a condenser.

Starting with blocks 1902 and 1904, a historical collection of weather data and refrigeration pack data may be received and used by one or more energy usage anomaly detection operations (see Operation 5 of FIG. 10), as in block 1906. Metering labelling disambiguation may be performed for one or more refrigeration pack submeter types (with 4 types being declared, HT, LT, REF and TBD), by comparing the generated energy usage profiles, as in block 1908 and 1910, against a knowledge domain of energy usage standards for known pack types. It may also be possible to establish with a degree of certainty (e.g., within a range of values or a percentage) a likely (e.g., most probable) type of the targeted refrigeration pack. For example, in block 1908, the pack ambiguously labelled "RP4" may be outputted in block 1912A as Refrigeration Pack Type LT, while in block 1910, the pack ambiguously labelled "RP1" may be outputted in block 1912B as a refrigeration pack type HT.

Figure 20:
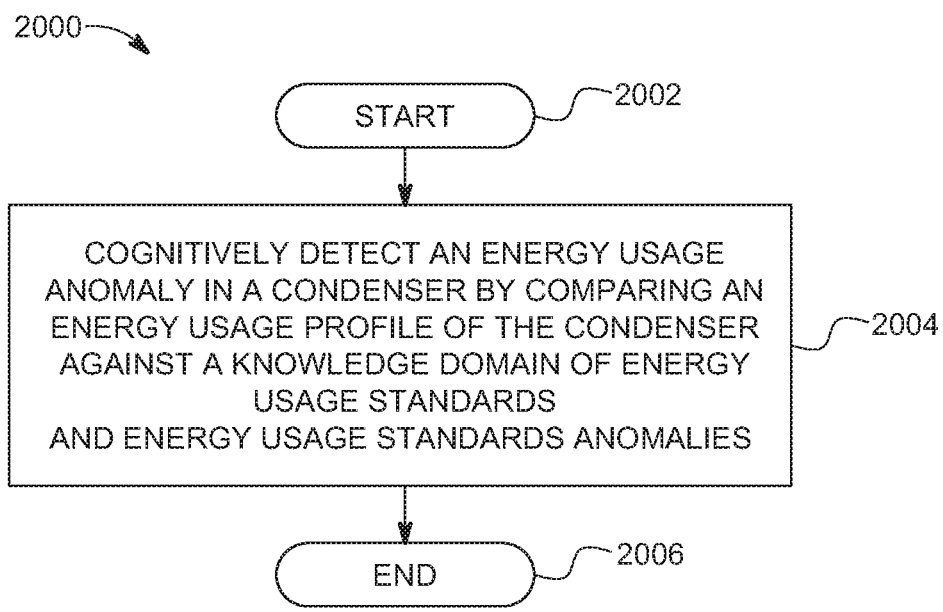
FIG. 20 is a flowchart diagram of an exemplary method for cognitive anomaly detection with fault diagnosis of a refrigeration condenser system by a processor, in which various aspects of the present invention may be realized.

FIG. 20 is an additional method 2000 for fault diagnosis and analysis of refrigeration condenser systems by a processor, in which various aspects of the illustrated embodiments may be implemented. The functionality 2000 may be implemented as a method executed as instructions on a machine, where the instructions are included on at least one computer readable medium or one non-transitory machine-readable storage medium. The functionality 2000 may start in block 2002. An energy usage anomaly in a condenser may be cognitively detected by comparing an energy usage profile of the condenser against a knowledge domain of energy usage standards and energy usage standards anomalies, as in block 2004. The functionality 2000 may end in block 2006.

In one aspect, in conjunction with and/or as part of at least one block of FIG. 20, the operations of method 2000 may include each of the following. The operations of method 2000 may include detecting the energy usage anomaly in one or more temperature zones of the condenser, defining the one or more temperature zones; and/or extracting behavior parameters of the condenser in the one or more temperature zones for detecting the energy usage anomaly.

The operations of method 2000 may include estimating energy waste based on the energy usage anomaly. More specifically, the energy waste may be estimated based on the energy usage anomaly according to the comparison of the energy usage profile of the condenser against one or more energy usage standards associated with the knowledge domain of the energy usage standards and the energy usage standards anomalies and a location of the condenser.

One or more energy usage standards may be defined in the knowledge domain for testing and validating the energy usage anomalies, wherein a root cause analysis is performed for each one of the tested and validated energy usage anomalies. A machine learning mechanism may be initialized using feedback information to learn behavior of the condenser, the energy usage profile, and behavior patterns of the heat unit in one or more temperature zones. The refrigeration pack may be in an Internet of Things (IoT) computing network. That is, a machine learning mechanism may use feedback information to learn behavior of the condenser, the energy usage profile, and behavior patterns of the condenser in one or more temperature zones, and the condenser is associated with a refrigeration pack included in the IoT computing network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for fault diagnosis and analysis of refrigeration condenser systems by a processor, comprising:
   collecting, by the processor, energy usage information of a condenser over a selected time period via an energy meter infrastructure associated with the condenser;
   coincident with collecting the energy usage information, collecting, by the processor, outside air temperature (OAT) information local to the condenser over the selected time period;
   correlating, by the processor, the energy usage information of the condenser to the OAT information to develop an energy usage profile specific to the condenser, wherein the correlating includes segregating a normalized baseload energy usage into each of one or more temperature zones of the condenser;
   training, by the processor, a machine learning model according to a plurality of features associated with the energy usage information of the energy usage profile and a knowledge database of energy usage standards and energy usage standards anomalies, wherein training the machine learning model includes preprocessing training data utilized in the training, the preprocessing including:
      aggregating and synchronizing, within a timeline, the collected energy usage information with the OAT information according to timestamps associated therewith to generate the energy usage profile, wherein the energy usage information and the OAT information comprise at least a portion of the plurality of features, using the correlation, including the normalized baseload energy into each of the one or more temperature zones of the condenser, to parameterize a rate of change of the energy usage information over a predetermined interval of degrees of the OAT information thereby computing a first order derivative of each of the one or more temperature zones of the condenser, and training the machine learning model with the preprocessed training data using a supervised learning operation to generate the trained machine learning model, the trained machine learning model determining energy usage behavior individually for each of a high temperature (HT) system and a low temperature (LT) system of the condenser within each of the one or more temperature zones;

responsive to generating the trained machine learning model, detecting, by the processor, an energy usage anomaly in the condenser by comparing the energy usage profile of the condenser against the knowledge database of energy usage standards and energy usage standards anomalies, wherein detecting the energy usage anomaly further includes selecting the parameterized rate of change of the energy usage information of a first time interval and a second time interval, comparing at least two different distributions of a slope value of specified features of the plurality of features of the parameterized rate of change of the first time interval and the second time interval, and determining that the energy usage anomaly exists when a defined statistical difference is present according to the comparison; and displaying, by the processor, the energy usage anomaly detected according to the comparison using the trained machine learning model on a user interface (UI) of a user device.

2. The method of claim 1, further including detecting the energy usage anomaly in the one or more temperature zones of the condenser.

3. The method of claim 2, further including:
defining the one or more temperature zones; and
extracting behavior parameters of the condenser in the one or more temperature zones for detecting the energy usage anomaly.

4. The method of claim 1, further including estimating energy waste based on the energy usage anomaly.

5. The method of claim 1, further including estimating energy waste based on the energy usage anomaly according to the comparison of the energy usage profile of the condenser against one or more energy usage standards associated with the knowledge database of the energy usage standards and the energy usage standards anomalies and a location of the condenser.

6. The method of claim 1, further including defining one or more energy usage standards in the knowledge database for testing and validating the energy usage anomalies, wherein a root cause analysis is performed for each one of the tested and validated energy usage anomalies.

7. The method of claim 1, wherein the condenser is associated with a refrigeration pack included in an Internet of Things (IoT) computing network.

8. A system for fault diagnosis and analysis of a refrigeration condenser system, comprising:
one or more computers with executable instructions that when executed cause the system to:

collect, by a processor associated with the one or more computers and executing the executable instructions, energy usage information of a condenser over a selected time period via an energy meter infrastructure associated with the condenser;

coincident with collecting the energy usage information, collect, by the processor, outside air temperature (OAT) information local to the condenser over the selected time period;

correlate, by the processor, the energy usage information of the condenser to the OAT information to develop an energy usage profile specific to the condenser, wherein the correlating includes segregating a normalized baseload energy usage into each of one or more temperature zones of the condenser;

train, by the processor, a machine learning model according to a plurality of features associated with the energy usage information of the energy usage profile and a knowledge database of energy usage standards and energy usage standards anomalies, wherein training the machine learning model includes preprocessing training data utilized in the training, the preprocessing including:

aggregating and synchronizing, within a timeline, the collected energy usage information with the OAT information according to timestamps associated therewith to generate the energy usage profile, wherein the energy usage information and the OAT information comprise at least a portion of the plurality of features, using the correlation, including the normalized baseload energy into each of the one or more temperature zones of the condenser, to parameterize a rate of change of the energy usage information over a predetermined interval of degrees of the OAT information thereby computing a first order derivative of each of the one or more temperature zones of the condenser, and training the machine learning model with the preprocessed training data using a supervised learning operation to generate the trained machine learning model, the trained machine learning model determining energy usage behavior individually for each of a high temperature (HT) system and a low temperature (LT) system of the condenser within each of the one or more temperature zones;

responsive to generating the trained machine learning model, detect, by the processor, an energy usage anomaly in the condenser by comparing the energy usage profile of the condenser against the knowledge database of energy usage standards and energy usage standards anomalies, wherein detecting the energy usage anomaly further includes selecting the parameterized rate of change of the energy usage information of a first time interval and a second time interval, comparing at least two different distributions of a slope value of specified features of the plurality of features of the parameterized rate of change of the first time interval and the second time interval, and determining that the energy usage anomaly exists when a defined statistical difference is present according to the comparison; and display, by the processor, the energy usage anomaly detected according to the comparison using the trained machine learning model on a user interface (UI) of a user device.

9. The system of claim 8, wherein the executable instructions further detect the energy usage anomaly in the one or more temperature zones of the condenser.

10. The system of claim 9, wherein the executable instructions further:
define the one or more temperature zones; and
extract behavior parameters of the condenser in the one or more temperature zones for detecting the energy usage anomaly.

11. The system of claim 8, wherein the executable instructions further estimate energy waste based on the energy usage anomaly.

12. The system of claim 8, wherein the executable instructions further estimate energy waste based on the energy usage anomaly according to the comparison of the energy usage profile of the condenser against one or more energy usage standards associated with the knowledge database of the energy usage standards and the energy usage standards anomalies and a location of the condenser.

13. The system of claim 8, wherein the executable instructions further define one or more energy usage standards in the knowledge database for testing and validating the energy usage anomalies, wherein a root cause analysis is performed for each one of the tested and validated energy usage anomalies.

14. The system of claim 8, wherein the condenser is associated with a refrigeration pack included in an Internet of Things (IoT) computing network.

15. A computer program product for fault diagnosis and analysis of refrigeration condenser systems by a processor, the computer program product comprising a non-transitory computer-readable storage medium having computer-readable program code portions stored therein, the computer-readable program code portions comprising:
an executable portion that collects, by the processor, energy usage information of a condenser over a selected time period via an energy meter infrastructure associated with the condenser;
an executable portion that, coincident with collecting the energy usage information, collects, by the processor, outside air temperature (OAT) information local to the condenser over the selected time period;
an executable portion that correlates, by the processor, the energy usage information of the condenser to the OAT information to develop an energy usage profile specific to the condenser, wherein the correlating includes segregating a normalized baseload energy usage into each of one or more temperature zones of the condenser;
an executable portion that trains, by the processor, a machine learning model according to a plurality of features associated with the energy usage information of the energy usage profile and a knowledge database of energy usage standards and energy usage standards anomalies, wherein training the machine learning model includes preprocessing training data utilized in the training, the preprocessing including:
aggregating and synchronizing, within a timeline, the collected energy usage information with the OAT information according to timestamps associated therewith to generate the energy usage profile, wherein the energy usage information and the OAT information comprise at least a portion of the plurality of features,
using the correlation, including the normalized baseload energy into each of the one or more temperature zones of the condenser, to parameterize a rate of change of the energy usage information over a predetermined interval of degrees of the OAT information thereby computing a first order derivative of each of the one or more temperature zones of the condenser, and
training the machine learning model with the preprocessed training data using a supervised learning operation to generate the trained machine learning model, the trained machine learning model determining energy usage behavior individually for each of a high temperature (HT) system and a low temperature (LT) system of the condenser within each of the one or more temperature zones;
an executable portion that, responsive to generating the trained machine learning model, detects, by the processor, an energy usage anomaly in the condenser by comparing the energy usage profile of the condenser against the knowledge database of energy usage standards and energy usage standards anomalies, wherein detecting the energy usage anomaly further includes selecting the parameterized rate of change of the energy usage information of a first time interval and a second time interval, comparing at least two different distributions of a slope value of specified features of the plurality of features of the parameterized rate of change of the first time interval and the second time interval, and determining that the energy usage anomaly exists when a defined statistical difference is present according to the comparison; and
an executable portion that displays, by the processor, the energy usage anomaly detected according to the comparison using the trained machine learning model on a user interface (UI) of a user device.

16. The computer program product of claim 15, further including an executable portion that detects the energy usage anomaly in the one or more temperature zones of the condenser.

17. The computer program product of claim 16, further including an executable portion that:
defines the one or more temperature zones; and
extracts behavior parameters of the condenser in the one or more temperature zones for detecting the energy usage anomaly.

18. The computer program product of claim 15, further including an executable portion that estimates energy waste based on the energy usage anomaly.

19. The computer program product of claim 15, further including an executable portion that estimates energy waste based on the energy usage anomaly according to the comparison of the energy usage profile of the condenser against one or more energy usage standards associated with the knowledge database of the energy usage standards and the energy usage standards anomalies and a location of the condenser.

20. The computer program product of claim 15, further including an executable portion that defines one or more energy usage standards in the knowledge database for testing and validating the energy usage anomalies, wherein a root cause analysis is performed for each one of the tested and validated energy usage anomalies; and
wherein the condenser is associated with a refrigeration pack included in an Internet of Things (IoT) computing network.

* * * * *